(12) United States Patent
Kuwana et al.

(10) Patent No.: US 6,215,605 B1
(45) Date of Patent: Apr. 10, 2001

(54) DRIVING DEVICE

(75) Inventors: Minoru Kuwana; Yasuo Nishihara, both of Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/340,505

(22) Filed: Jul. 1, 1999

(30) Foreign Application Priority Data

| Jul. 2, 1998 | (JP) | 10-187070 |
| Jul. 2, 1998 | (JP) | 10-187071 |
| Jul. 8, 1998 | (JP) | 10-192608 |

(51) Int. Cl.$^7$ .................................. G02B 7/02
(52) U.S. Cl. ..................... 359/824; 359/822; 359/698
(58) Field of Search ................ 359/822, 823, 359/824, 696, 697, 698

(56) References Cited

U.S. PATENT DOCUMENTS

| 5,225,941 | * | 7/1993 | Saito et al. | 359/824 |
| 5,430,375 | * | 7/1995 | Inoue et al. | 359/698 |
| 5,541,777 | * | 7/1996 | Sakamoto et al. | 359/824 |
| 5,587,846 | * | 12/1996 | Miyano et al. | 359/824 |
| 5,633,763 | * | 5/1997 | Suzuki et al. | 359/822 |
| 5,675,444 | * | 10/1997 | Ueyama et al. | 359/824 |
| 5,828,503 | * | 10/1998 | Kaneda et al. | 359/824 |
| 5,859,733 | * | 1/1999 | Miyano et al. | 359/824 |
| 6,016,231 | * | 1/2000 | Kanbara et al. | 359/824 |
| 6,134,057 | * | 10/2000 | Ueyama et al. | 359/824 |

FOREIGN PATENT DOCUMENTS

| 04039611 | 2/1992 | (JP) . |
| 04060601 | 2/1992 | (JP) . |
| 05072462 | 3/1993 | (JP) . |
| 08029660 | 2/1996 | (JP) . |

* cited by examiner

*Primary Examiner*—Loha Ben
(74) *Attorney, Agent, or Firm*—McDermott, Will & Emery

(57) ABSTRACT

A plurality of movable lenses included in a zoom lens system are driven individually by piezoelectric actuators provided one for each lens. Two driving rods are arranged at different positions along the same line in such a way that neither of the driving rods reaches into the driving stroke of the lens driven by the other. Each driving rod has a piezoelectric actuator provided at its end farther from the other. Alternatively, a plurality of piezoelectric actuators are fixed to a single base block having a groove or a surface level difference to restrict propagation of vibration between the piezoelectric actuators. A graduated member having N-pole and S-pole regions formed alternatively thereon with a predetermined pitch is fixed, parallel to the driving rods, to the driving device itself. A magnetic resistance sensor is attached to each lens frame so as to face the graduated member. Based on the outputs of the sensors, the positions of the individual lenses are detected.

14 Claims, 17 Drawing Sheets

DRIVING DEVICE

This application is based on application Nos. H10-187070, H10,187071 and H10-192608 filed in Japan, the content of which is hereby incorporated by reference.

BACKGROUND OF THE INVENTION

1. Field of the Invention

The present invention relates to a driving device for driving a plurality of driven members in the same direction or in opposite directions, and particularly to a driving device having a driving element and a driving rod provided for each of driven members so that the driven members can be driven individually.

2. Description of the Prior Art

To drive a plurality of driven members along the same line while keeping them in a predetermined positional relationship, it is customary to drive all of the driven members by means of a single driving element combined with a guide mechanism that guides the driven members along the driving direction while controlling their relative positions. For example, in a zoom lens system, helicoids having different pitches are provided, as a guide mechanism, on a lens barrel, so that, by converting the rotation amount of a motor into different driving amounts for individual movable lenses, the movable lenses are kept in a predetermined positional relationship. This makes it possible to vary the focal length while keeping the focal point fixed.

In recent years, it has been becoming increasingly common to keep driven members in a predetermined positional relationship by providing a driving element and a driving rod for each of a plurality of driven members so that the driven members are driven individually and the outputs of the driving elements are adjusted individually. A driving device based on this principle requires a greater number of driving elements, but does not require a complicated guide mechanism that demands high precision. Accordingly, a driving device of this type can be realized with a simple structure, and is thus particularly suitable for cases where light-weight driven members are driven by small amounts.

As an example of driving device having a driving element and a driving rod provided for each of driven members, FIG. 29 shows a driving device designed for use in a taking lens system of a digital camera. This driving device 16 is for driving two movable lenses LA and LB included in a zoom lens system.

The driving device 16 is composed of two piezoelectric actuators 51 and 52 serving as driving elements, two driving rods 53 and 54, and one guide rod 55. The piezoelectric actuators 51 and 52 are, at their rear-end surface, individually fixed to two base blocks (not shown), and the driving rods 53 and 54 are fixed to the front-end surface of the piezoelectric actuators 51 and 52. The piezoelectric actuators 51 and 52, when a voltage is applied thereto, expands or contracts along the direction connecting their front-end and rear-end surfaces in accordance with the magnitude of the voltage applied. The driving rods 53 and 54 are arranged parallel to each other, and the guide rod 55 is arranged below the mid line between the driving rods 53 and 54 and parallel thereto.

The lenses LA and LB are individually held in lens frames 56 and 57. The lens frames 56 and 57 have projections 56a and 57a formed in their obliquely upper portion, and through these projections 56a and 57a are formed through holes through which the driving rods 53 and 54 are placed. The lens frames 56 and 57 also have projections 56b and 57b formed in their lower portion, and in these projections 56b and 57b are formed grooves that engage with the guide rod 55. In a side surface of the projection 56a of the lens frame 56, an opening is formed through which a portion of the driving rod 53 is exposed, and a plate spring 56c is provided by which the portion of the driving rod 53 exposed through the opening is pressed with an adequate force. By the pressing force of the plate spring 56c, the inner surface of the through hole formed through the projection 56a is kept in slidable contact with the driving rod 53. Although not shown in FIG. 29, the projection 57a of the lens frame 57 has the same structure, so that the inner surface of the through hole formed through the projection 57a is kept in slidable contact with the driving rod 54. The wall surfaces of the grooves formed in the projections 56b and 57b of the lens frames 56 and 57 are kept in loose slidable contact with the guide rod 55 so as to prevent rotation of the lenses LA and LB.

A piezoelectric actuator, when the voltage applied thereto varies abruptly, expands or contracts abruptly and, when the voltage applied thereto varies gradually, expands or contracts gradually. As the piezoelectric actuators 51 and 52 expand or contract, the driving rods 53 and 54 are displaced. The lens frames 56 and 57, which are kept simply in slidable contact with the driving rods 53 and 54, follow the displacement of the driving rods 53 and 54 when the displacement is slow, but cannot follow the displacement and thus remain where they are when the displacement is fast.

Accordingly, by causing an abrupt rise followed by a gradual drop repeatedly in the voltage applied to the piezoelectric actuators 51 and 52, it is possible to drive the lenses LA and LB in one direction; by contrast, by causing a gradual rise followed by an abrupt drop repeatedly in the voltage, it is possible to drive the lenses LA and LB in the opposite direction. The speed at which the lenses LA and LB are driven can be adjusted by varying the magnitude and the cycle of the voltage applied.

By controlling the voltage applied to the piezoelectric actuators 51 and 52 individually and thereby driving the lenses LA and LB individually, it is possible to keep the lenses LA and LB in a predetermined positional relationship.

However, in the above-described driving device 16, in which a driving element and a driving rod are provided for each of driven members, the driving elements, and also the driving rods, are arranged parallel to each other, and therefore the driven members can be driven not through the whole length of the driving rods but through only a portion thereof. This means that the driving rods are unnecessarily long, occupying unduly large spaces.

When piezoelectric actuators are used as driving elements, even though the driving rods are made of a highly rigid material, it is impossible to eliminate elastic deformation completely. For this reason, the longer the driving rods, the more difficult it is to drive the driven members efficiently because of absorption of the driving force from the piezoelectric actuators and delay in transmission of the driving force. Moreover, this leads to loss of energy. Furthermore, the longer the driving rods, the more rigid they need to be. This narrows the choice of the material of the driving rods and increases their cost.

To achieve efficient displacement of the driving rods, the rear-end surfaces of the piezoelectric actuators need to be fixed securely so that their expansion and contraction are transmitted to the driving rods without loss. For this reason, the base blocks, to which the piezoelectric actuators are fixed, are made of stainless steel, which is a heavy, rigid material. However, in the driving device 16 described above, the piezoelectric actuators are fixed to separate base blocks, and this makes the driving device 16 unduly large.

One way to increase the weight of the base blocks without making the driving device larger is, as shown in FIG. 30, by fixing both of the piezoelectric actuators 51 and 52 to a single, integrally-formed based block 60 that is approximately twice as large as one conventional base block. However, in a driving device of this type, the expansion and contraction of one piezoelectric actuators are transmitted, as vibration, to the other piezoelectric actuator through the base block, and this may adversely affect driving. For example, such vibration causes variations in the driving amount among the driven members even if a voltage having a predetermined magnitude is applied for a predetermined length of time with a predetermined cycle.

To achieve accurate driving, it is essential to detect the movement amount or position of driven members. For this purpose, it is customary to provide a graduated member that changes its relative position as driving proceeds and a sensor that reads the graduations marked on the graduated member, so that the position of the driven members is detected on the basis of the number of graduations read by the sensor. One of the graduated member and the sensor is fixed to the driving device itself, and the other is fixed to the driven members so as to move together therewith. The detection of the position by the combination of the graduated member and the sensor is achieved optically, or on the basis of another physical property.

FIG. 31 shows an example of a driving device of this type. This driving device 17 is for driving a lens L, and is composed of a piezoelectric actuator 71, a driving rod 72, a guide rod 73, supporting walls 74 and 75, a magnetized plate 76 serving as a graduated member, and a magnetic resistance (MR) sensor 77. The piezoelectric actuator 71, the driving rod 72, and the guide rod 73 are the same as their counterparts in the driving device 16. The driving rod 72 is slidably supported by the supporting walls 74 and 75, and the guide rod 73 is fixed to the supporting walls 74 and 75.

The magnetized plate 76 is fitted, parallel to the driving rod 72, to a projection 82 formed on a lens frame 81 for holding the lens L. The surface of the magnetized plate 76 is magnetized in such a way that many N-pole and S-pole regions are formed alternately with a predetermined pitch along the direction parallel to the driving rod 72.

The MR sensor 77 changes its electric resistance according to the magnetic field around it. The MR sensor 77 is fixed to a plate spring 78 screwed to the supporting wall 75, and is so arranged as to face the magnetized surface of the magnetized plate 76. The MR sensor 77 has a spacer (not shown) having a uniform thickness bonded over its surface, and is lightly pressed against the magnetized plate 76 by the pressing force of the plate spring 78 so as to be kept at a constant distance from the magnetized surface of the magnetized plate 76.

When the piezoelectric actuator 71 expands and contracts to vibrate the driving rod 72 and thereby move the lens frame 81, the magnetized plate 76 moves together, and the magnetic field around the MR sensor 77, which is fixed, changes periodically. Accordingly, the output of the MR sensor 77 changes periodically. Thus, from the number of cycles of change in the output of the MR sensor 77 and the pitch of the N-pole and S-pole regions of the magnetized plate 76, the driving amount of the lens L is calculated. By accumulating the driving amount from a predetermined reference position, the position of the lens L is determined.

It is also possible to fit the MR sensor 77 to the lens frame 81 to make it movable and fix the magnetized plate 76. Also this arrangement allows determination of the position of the lens L.

In this driving device 17, the position is detected directly by reading the graduations, and therefore it is possible to determine the position of the lens accurately at all time. For example, even when manufacturing errors cause variations in the force by which the driving rod and the lens frame are kept in sliding contact, and accordingly the driving amount by which the lens frame is driven every time the piezoelectric actuator expands or contracts is not constant, the detected lens position includes no error. In other words, highly accurate detection of the position is possible irrespective of the precision of the driving mechanism.

When two or more driven members are driven individually in the same direction or in opposite directions by this method, it is necessary only to provide a driving element such as a piezoelectric actuator, a driving rod, a graduated member, and a sensor for each of the driven members. However, to keep the driven members in a predetermined positional relationship at all times, it is essential to position the individual graduated members accurately relative to each other, and this requires highly accurate assembly.

For example, in a zoom lens system like the above-described one provided with the driving device 16, in which the focal length is varied by driving two lenses, an error in the relative positions of the lenses makes it impossible to obtain a desired focal length, and causes a deviation of the focal point, making it impossible to obtain a sharp image at a fixed position. To prevent this, it is essential to drive the lenses while keeping them accurately in a predetermined positional relationship. This requires accurate positioning of the two graduated members, and accordingly their positioning in assembly requires an unduly long time.

Moreover, providing a graduated member for each of driven members requires a space to be secured for each graduated member, and thus hampers miniaturization of the driving device. This inconvenience occurs even in cases where driven members do not need to be kept in a predetermined positional relationship.

SUMMARY OF THE INVENTION

An object of the present invention is to provide a compact high-precision driving device for driving a plurality of driven members individually in the same direction or in opposite directions.

According to one aspect of the present invention, a driving device is provided with: a first driving source; a first driving rod coupled to the first driving source, the first driving rod driving a first driven member axially by using the driving force of the first driving source; a second driving source; and a second driving rod coupled to the second driving source and arranged in the same direction as the first driving rod, the second driving rod driving a second driven member axially by using the driving force of the second driving source. Here, the first driving source is arranged at one end of the entire driving stroke of the first and second driven members and the second driving source is arranged at the other end of the entire driving stroke of the first and second driven members.

In this driving device, it is possible to make the width of the device, as measured perpendicularly to the driving direction the first and second driven members, smaller than the sum of the widths of the first and second driving sources. Thus, it is possible to realize a compact driving device.

The first and second driving rods may be arranged axially away from each other in such a way as not to reach into the driving strokes of the second and first driven members, respectively, with the first driving source arranged at that end of the first driving rod farther from the second driving rod and the second driving source arranged at the end of the second driving rod farther from the first driving rod. By arranging the first and second driving rods in this way, neither of them have almost no part of the other placed next to itself. Thus, it is possible to minimize the lengths of the first and second driving rods including the driving strokes of the first and second driven members, respectively.

The first and second driving rods may be arranged on the same line. In this way, it is possible to make the width of the space occupied by the driving rods equal to the width of the space that will be occupied by the driving rod if there is only one driving rod provided.

For example, the first and second driving sources are piezoelectric actuators that expand or contract according to the voltages applied thereto, and the first and second driving rods are kept in slidable contact with the first and second driven members, respectively. Thus, when the first and second driving sources are made to expand and contract repeatedly, they vibrate the first and second driving rods axially and thereby drive the first and second driven members.

According to another aspect of the present invention, a driving device is provided with: a first driving element; a first driving rod fixed to one end of the first driving element; a second driving element; a second driving rod fixed to one end of the second driving element; and a base block to which the other end of the first driving element and the other end of the second driving element are fixed, the base block having such a structure as to restrict propagation of vibration caused by the first driving element to the second driving element and of vibration caused by the second driving element to the first driving element.

By fixing the first and second driving elements to the same base block, it is possible to double the weight of the base block per driving element, and thereby reduce the loss of the driving power of the individual driving elements. In addition, since the base block restricts propagation of vibration, it is possible to reduce the adverse effect of the vibration of one driving element on the driving of the other driving element.

Here, it is possible to arrange the first and second driving rods in the same direction and use, as the first and second driving elements, driving elements that expand and contract and thereby vibrate the first and second driving rod axially. In this arrangement, the base block restricts propagation of vibration in a direction perpendicular to the first and second driving rods.

In this case, it is possible to restrict propagation of vibration, for example, by providing a groove between the portions of the base block on which the driving elements are fixed. Even if expansion and contraction of one driving element are propagated as vibration along the top surface of the base block, the vibration is shut off by the groove, and thus the other driving elements is scarcely affected.

Alternatively, it is also possible to restrict propagation of vibration by securing a level difference between the portions of the base block on which the driving elements are fixed. Even if expansion and contraction of the driving element that is fixed on the higher portion of the base block are propagated as vibration along the top surface of the base block, the portion on which the other driving element is fixed does not lie at the same level, and thus the other driving element is scarcely affected. Even if expansion and contraction of the driving element that is fixed on the lower portion of the base block are propagated as vibration along the top surface of the base block, the vibration is propagated only to the deep part of the portion on which the other driving element is fixed, and thus, similarly, the other driving element is scarcely affected.

According to still another aspect of the present invention, a driving device is provided with: a plurality of drivers for driving a plurality of driven members individually in the same direction or in opposite directions; one graduated member whose surface property varies at regular intervals along the driving direction of the driven members; a plurality of sensors for detecting the property, the sensors being fitted one to each of the driven members; a position detectors for detecting the positions of the driven members based on the number of variations of the property as detected by the sensors; and a controller for controlling the drivers to drive the driven members based on the positions detected by the position detector.

In this driving device, the surface of the graduated member is given variations of a predetermined property that can be used as graduations. One graduated member is shared to detect the positions of all of the driven members. Accordingly, it is possible to minimize the space required to arrange the graduated member. In addition, since no deviation occurs between the graduations read by the individual sensors, it is possible to keep all of the driven members in a desired positional relationship accurately.

The graduated member may be designed to serve also as a restricting member for restricting the movement of the driven members in a direction perpendicular to the driving direction. This arrangement eliminates the need to provide a restricting member separately and thus helps further reduce the space required.

The graduated member may have only one surface having the property. If this surface is flat, all of the sensors need to be arranged so as to face the graduated member from the same direction. If the graduated member is cylindrical and has a curved surface, the individual sensors can be arranged so as to face the graduated member from different directions, and thus the sensors and the driven members can be arranged with more flexibility in terms of their positions.

Alternatively, the graduated member may have two flat surfaces having the property, with the two surfaces facing in different directions. This makes it possible to arrange the individual sensors so as to face the graduated member from one of two directions, and thereby minimize restrictions as to the positions of the sensors and the driven members relative to the graduated members. For example, if the graduated member is shaped like a flat plate having the property on its both sides, it is possible to arrange the sensors and the driven members on both sides of the graduated member.

Any property can be used as the graduations provided on the surface of the graduated member; for example, the property may be magnetism. In this case, the graduated member has N-pole and S-pole regions formed alternately on its surface, and, as the sensors, magnetic resistance sensors are used whose electrical resistance varies according to ambient magnetism. The N-pole and S-pole regions can be formed at minute intervals, and the magnetic resistance sensors offer high sensitivity. Thus, it is possible to detect the positions of the driven members accurately.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 9:
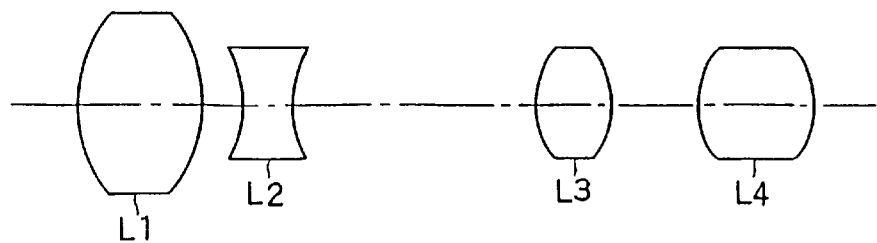
FIG. 9 is a diagram showing a zoom lens system composed of two fixed lenses and two movable lenses.
Figure 10:
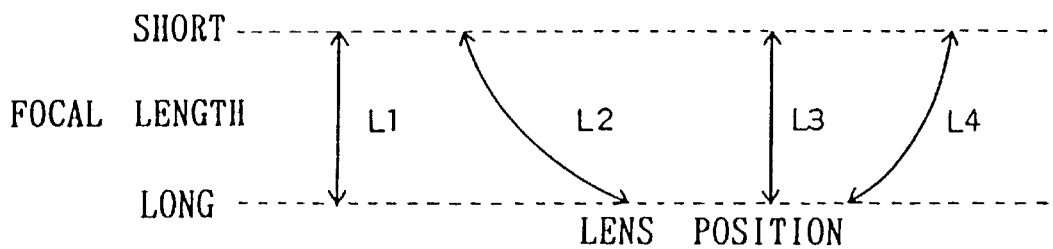
FIG. 10 is a diagram showing the relationship between the focal length and the lens positions in the zoom lens system shown in FIG. 9.

Hereinafter, driving devices embodying the present invention, as applied to driving of the taking lens of a camera, will be described with reference to the accompanying drawings. The driving device of a first embodiment is for driving a zoom lens system composed of four lenses as shown in FIG. 9. In this zoom lens system, the first and third lenses, L1 and L3 are fixed, and the second and fourth lenses L2 and L4 are movable. The relationship between the focal length and the positions of the individual lenses is shown in FIG. 10. The lenses L2 and L4 are movable through several millimeters.

Figure 1:
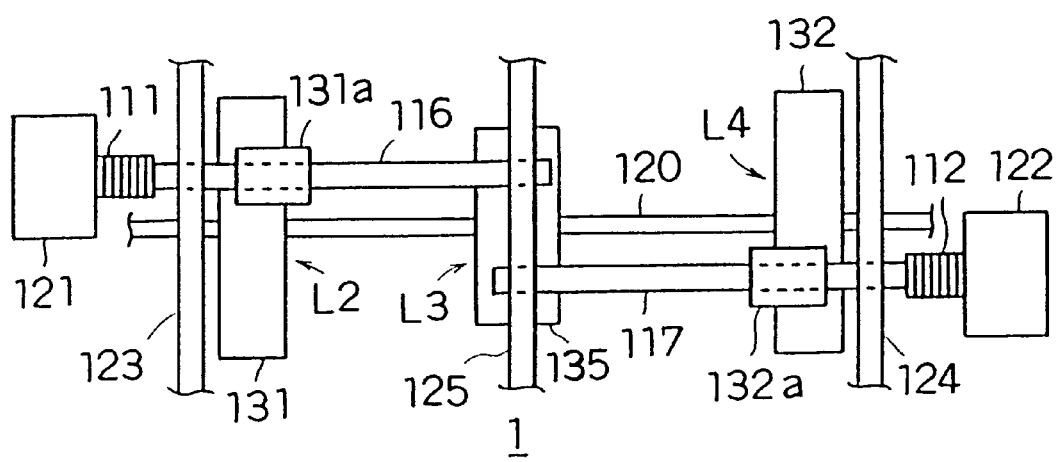
FIG. 1 is a plan view of the driving device of a first embodiment of the invention.
Figure 2:
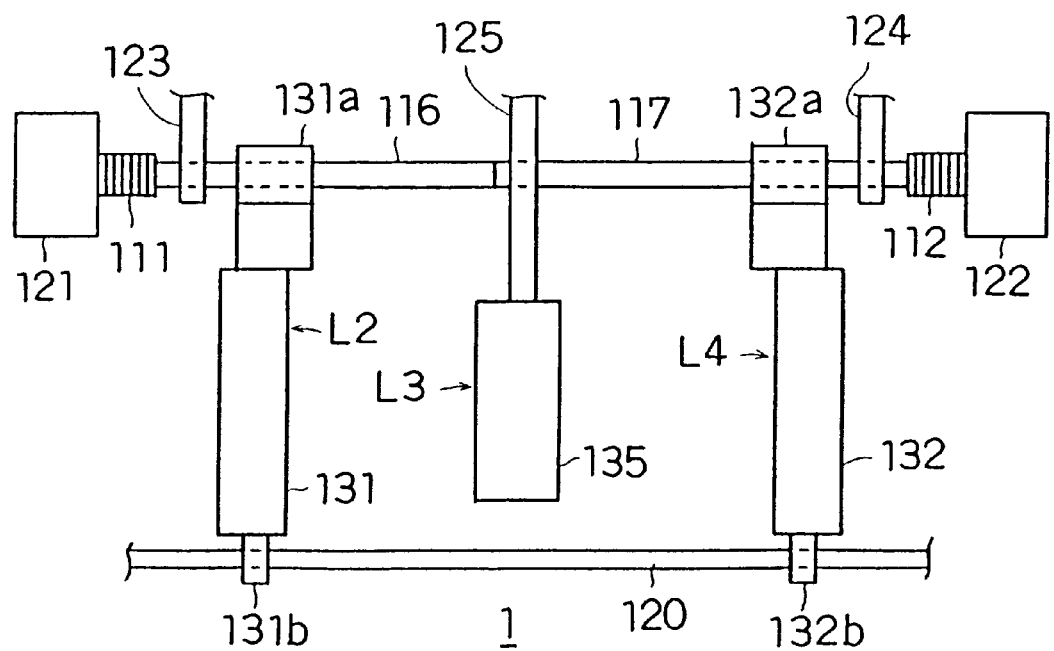
FIG. 2 is a side view of the driving device of the first embodiment.

A plan view and side view of the driving device 1 of the first embodiment, for driving the second and fourth lenses L2 and L4, are shown in FIGS. 1 and 2, respectively. Note that the first lens L1 is not shown in these figures. The driving device 1 is provided with two piezoelectric actuators 111 and 112 serving as driving elements, two driving rods 116 and 117, one guide rod 120, two base blocks 121 and 122, and three supporting walls 123, 124, and 125. The second lens L2 is driven by the piezoelectric actuators 111 and the driving rod 116, and the fourth lens L4 is driven by the piezoelectric actuators 112 and the driving rod 117.

The piezoelectric actuators 111 and 112 are, at their rear-end-surface, fixed to the base blocks 121 and 122, respectively, and expand or contract along the front/rear direction in accordance with the magnitude of the voltage applied thereto. The driving rods 116 and 117 are fixed to the front-end surface of the piezoelectric actuators 111 and 112, and are displaced along their axis as the piezoelectric actuators 111 and 112 expand or contract. The piezoelectric actuators 111 and 112, and also the driving rods 116 and 117, are arranged in opposition directions to each other, with the driving rods 116 and 117 placed parallel to each other and in addition next to each other only at their tip-end portion. The base blocks 121 and 122 are fixed to a lens barrel (not shown). The guide rod 120 is arranged below the mid line between the driving rods 116 and 117 and parallel thereto, and is fixed, at its two ends, to the lens barrel.

The supporting walls 123 and 124 support the based-end portion of the driving rods 116 and 117, respectively. The supporting wall 125 keeps the third lens L3 in a fixed position, and in addition supports the tip-end portion of the driving rods 116 and 117. The supporting walls 123, 124, and 125 are fixed to the lens barrel. The supporting walls have through holes, each having a smooth inner surface, formed therethrough, and the driving rods 116 and 117 are placed through those through holes so as to be supported slidably. The tip-end portion of the driving rods 116 and 117 slightly protrudes from the supporting wall 125.

Figure 29:
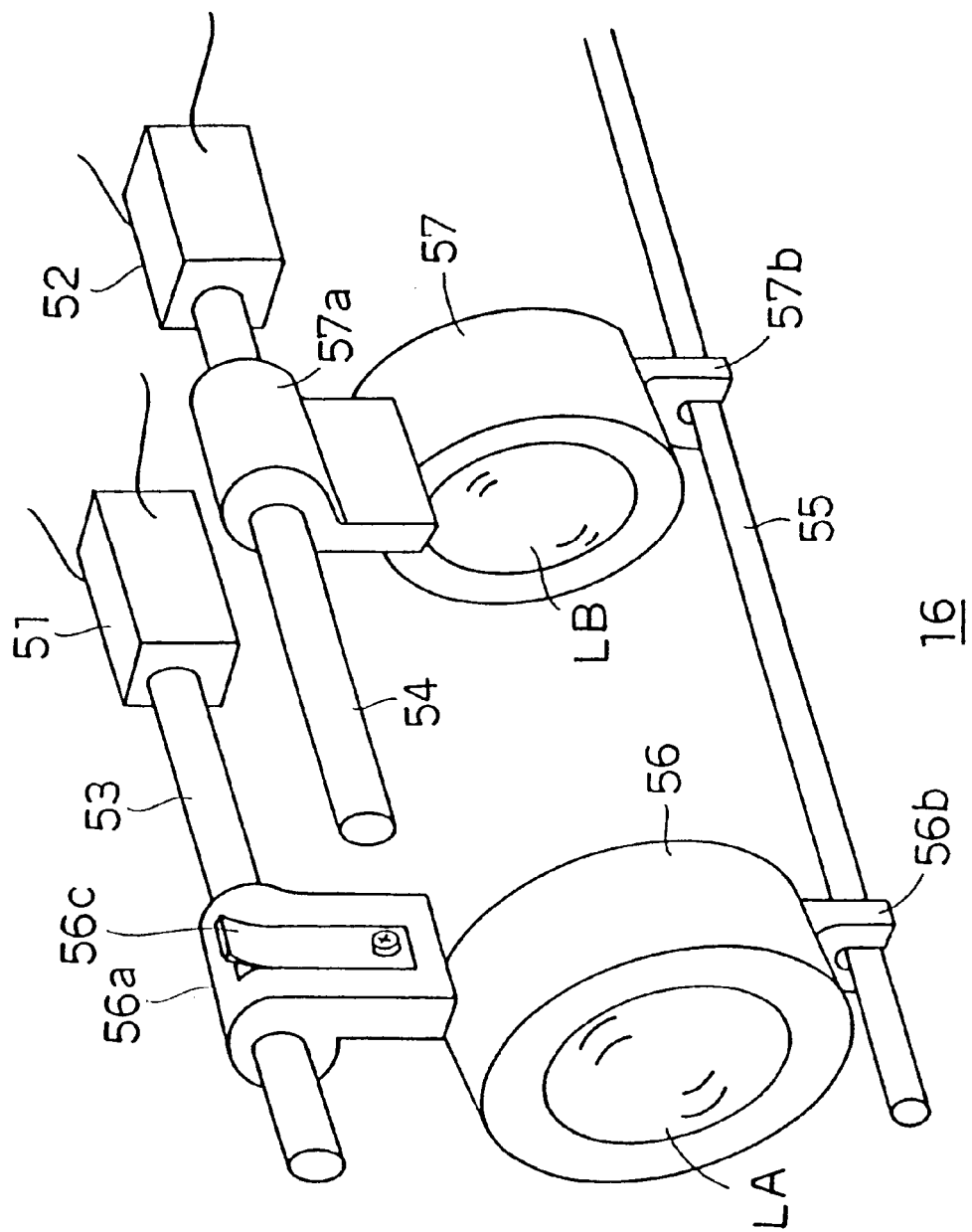
FIG. 29 is a perspective view of a conventional driving device.
Figure 30:
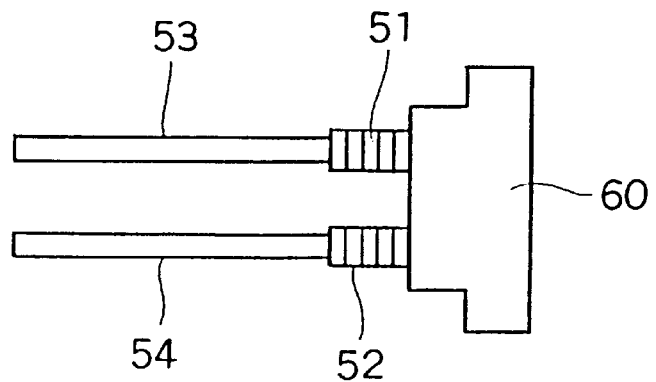
FIG. 30 is a plan view of the base block, piezoelectric actuators, and driving rods of a conventional driving device.
Figure 31:
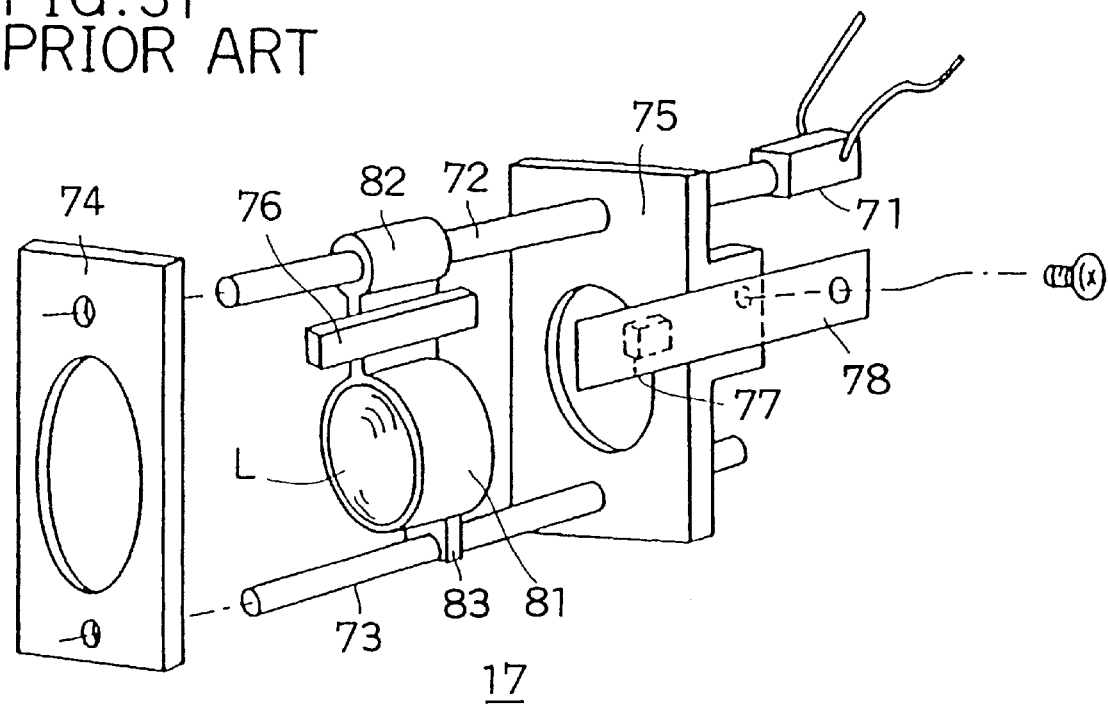
FIG. 31 is an exploded perspective view of another conventional driving device.

The lenses L2, L3, and L4 are held in lens frames 131, 135, and 132, respectively. The lens frames 131 and 132 for the second and fourth lenses L2 and L4 have projections 131a and 132a formed in their obliquely upper portion, and have projections 131b and 132b formed in their lower portion. Though not shown in FIGS. 1 and 2, in the projections 131a and 132a, as in the projections 56a shown in FIG. 29, through holes are formed through which the driving rods 116 and 117 are placed, opening are formed through which a portion of the driving rods 116 and 117 is exposed to the side of the through holes, and plate springs are provided by which the portion of the driving rods 116 and 117 exposed through those openings is pressed with an adequate force. By the pressing force of the plate springs, the inner surfaces of the through holes formed through the projections 131a and 132a are placed in slidable contact with the driving rods 116 and 117, respectively. Moreover, in the projections 131b and 132b, as in the projection 56b shown in FIG. 29, grooves are formed in which the guide rod 120 is slidably placed to prevent rotation of the lenses L2 and L4.

The driving rods 116 and 117 are made of a highly rigid carbon resin, and is so formed as to have a smooth outer surface. The driving rod 116 has a minimum length that is necessary to cover the entire driving stroke of the second lens L2 shown in FIG. 10 and in addition allow itself to be supported by the supporting walls 123 and 125. In the same manner, the driving rod 117 has a minimum length that is necessary to cover the entire driving stroke of the fourth lens L4 and in addition allow itself to be supported by the supporting walls 124 and 125.

Figure 13A:
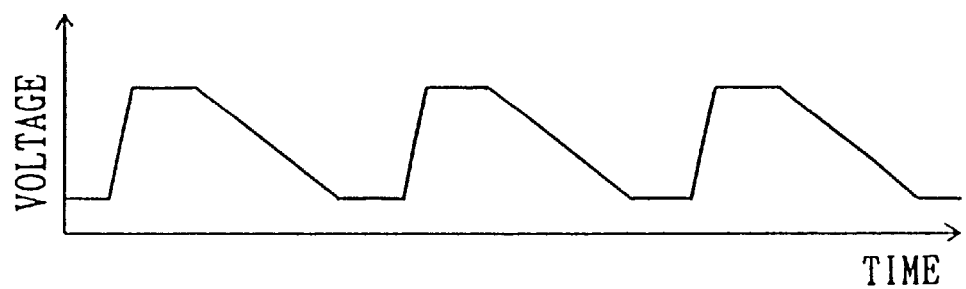
FIGS. 13A and 13B are diagrams showing examples of the voltage applied to a piezoelectric actuator.
Figure 13B:
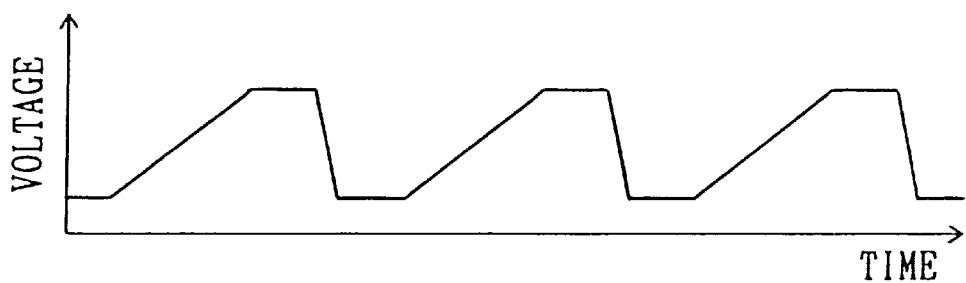

Examples of the voltage applied to the piezoelectric actuators 111 and 112 are shown in FIGS. 13A and 13B. The lenses L2 and L4 are driven in one direction by causing an abrupt rise and then a gradual drop repeatedly in the voltage applied thereto as shown in FIG. 13A, and are driven in the opposite direction by causing a gradual rise and then an abrupt drop repeatedly in the voltage applied thereto as shown in FIG. 13B. The voltage applied to the piezoelectric actuators 111 and 112 is controlled individually, so that the second and fourth lenses L2 and L4 are kept in a predetermined positional relationship as shown in FIG. 10. This makes it possible to vary the focal length of the taking lens while keeping its focal point fixed.

The driving rods 116 and 117 are placed next to each other only at their tip-end portion; that is, except at their tip-end portion, neither of the driving rods 116 and 117 have the other driving rod placed next to itself. As a result, in the direction of extension of the driving rods 116 and 117 remains a space that can be used to place other members. Moreover, since the driving rods 116 and 117 are both only slightly longer than the driving stroke of the lenses L2 and L4, which they respectively drive, it is possible to minimize absorption of expansion and contraction of the piezoelectric actuators 111 and 112 and delay in transmission thereof to the lenses L2 and L4. Thus, it is possible to drive the lenses L2 and L4 efficiently, making the most of available energy.

Although the driving rods 116 and 117 are made of a highly rigid carbon resin here to obtain as high driving efficiency as possible, it is possible to obtain driving efficiency higher than in conventional driving devices even if the driving rods 116 and 117 are made of a somewhat less rigid material, because, by making the driving rods 116 and 117 shorter, it is possible to achieve a significant reduction in absorption of the driving force and delay in transmission thereof. This makes is possible to obtain desired driving efficiency with a wider choice of materials for the driving rods, and thus helps reduce the cost of the driving device. For example, it is possible to use a metal such as stainless steel as the material of the driving rods 116 and 117.

Figure 3:
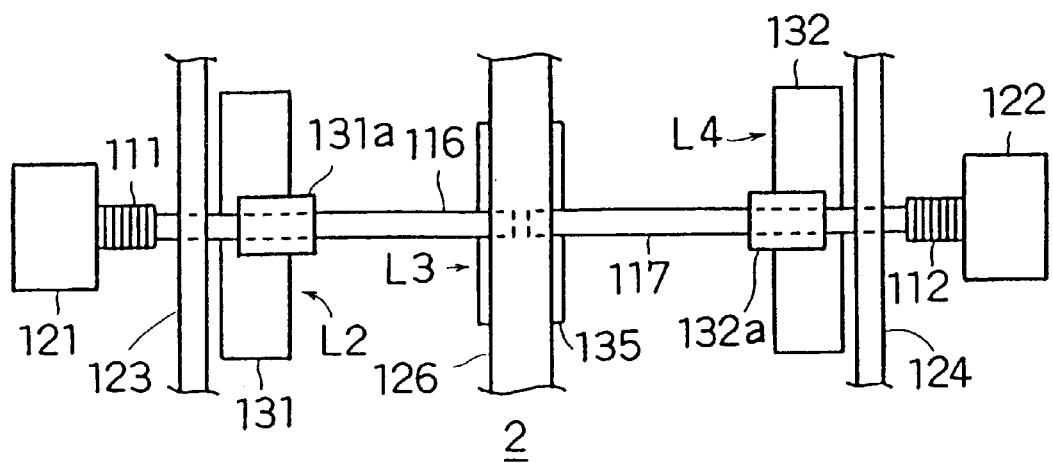
FIG. 3 is a plan view of the driving device of a second embodiment of the invention.
Figure 4:
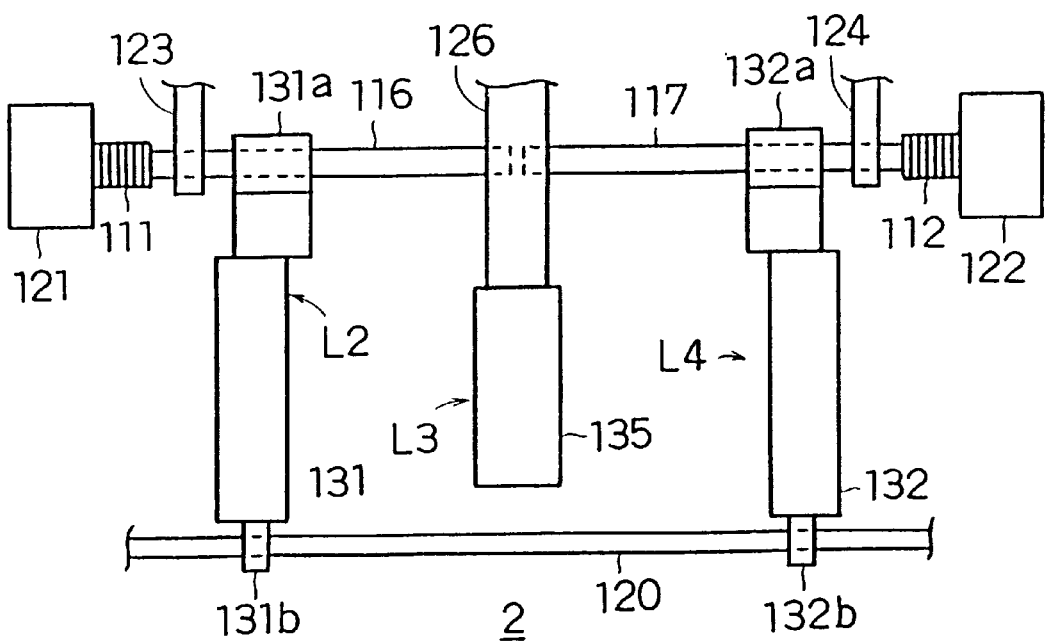
FIG. 4 is a side view of the driving device of the second embodiment.

A plan view and a side view of the driving device 2 of a second embodiment are shown in FIGS. 3 and 4, respectively. This driving device 2 is also for driving the second and fourth lenses L2 and L4 of the zoom lens system shown in FIG. 9. However, this driving device 2 is different from the driving device 1 in that, in this driving device 2, the first and second driving rods 116 and 117 are arranged on the same line. The supporting wall 126 for supporting the tip-end portion of the driving rods 116 and 117 is made thicker than the previously described supporting wall 125, and has only one through hole that is shared to support the tip-end portion of the driving rods 116 and 117. The tip end of the driving rod 116 and the tip end of the driving rod 117 are placed several hundred micrometers or more apart from each other, so that they do not come into contact with each other.

By arranging the driving rods 116 and 117 on the same line in this way, it is possible to make the space occupied by the driving rods as small as would be occupied by one long driving rod, and thus it is possible to use the available space even more efficiently than in the driving device 1 of the first embodiment. The lens frames 131 and 132 have the projections 131a and 132a formed in its upper central portion, and thus the optical axis of the lenses L2 and L4, the axes of the driving rods 116 and 117, and the axis of the guide rod 120 lie on the same plane.

Figure 11:
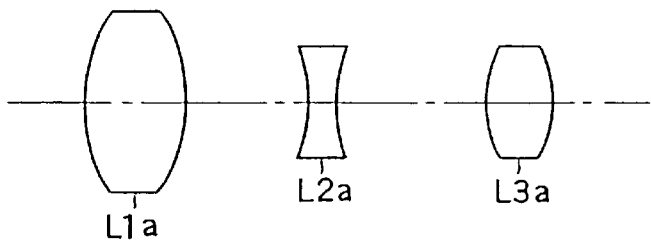
FIG. 11 is a diagram showing a zoom lens system composed of three movable lenses.
Figure 12:
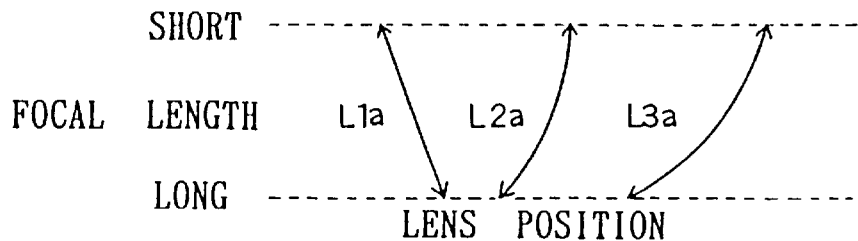
FIG. 12 is a diagram showing the relationship between the focal length and the lens positions in the zoom lens system shown in FIG. 11.

The driving device of a third embodiment is for driving a zoom lens systems composed of three lenses as shown in FIG. 11. The first, second, and third lenses L1a, L2a, and L3a are all movable. The relationship between the focal length and the positions of the individual lenses is shown in FIG. 12.

Figure 5:
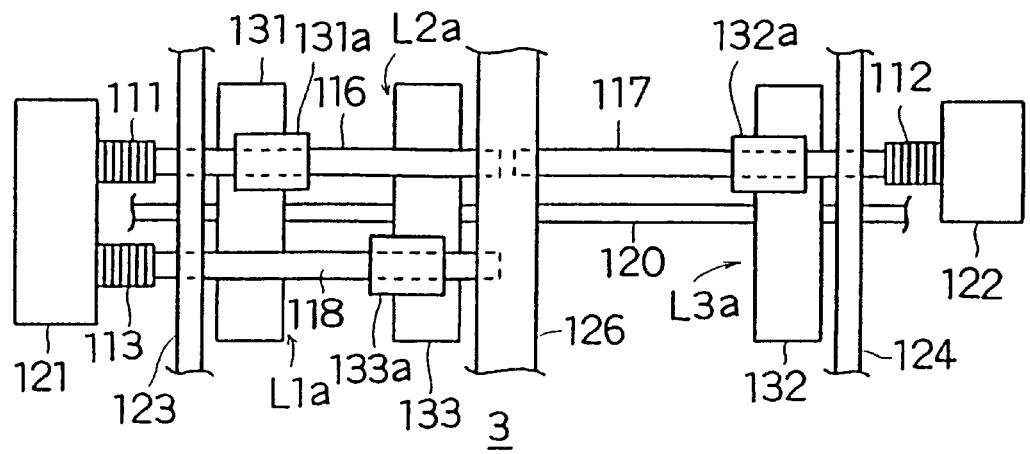
FIG. 5 is plan view of the driving device of a third embodiment of the invention.
Figure 6:
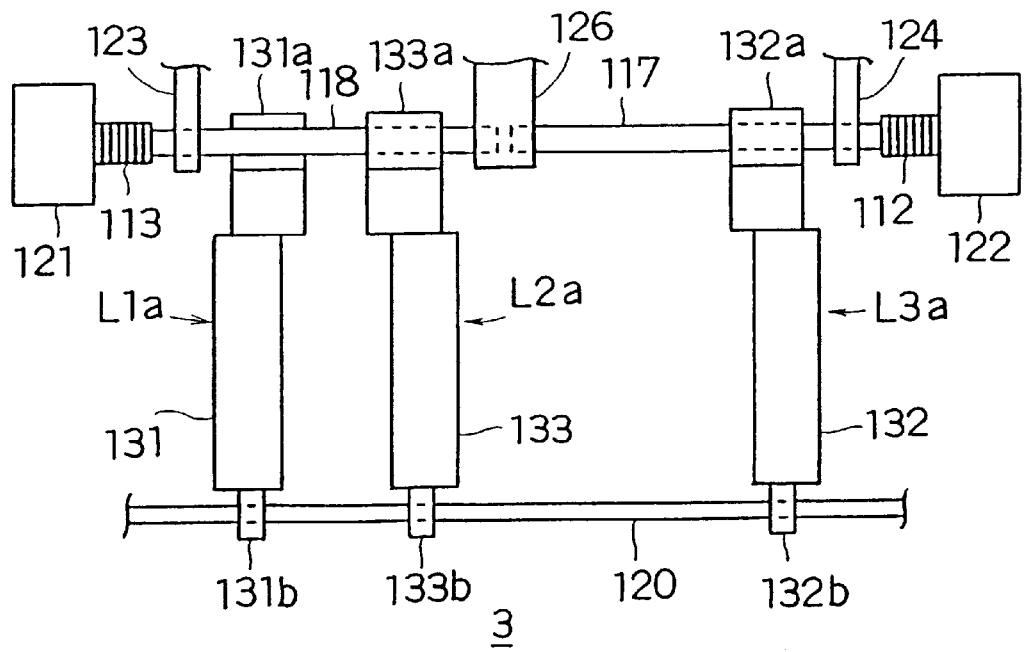
FIG. 6 is a side view of the driving device of the third embodiment.

A plan view and a side view of the driving device 3 of the third embodiment are shown in FIGS. 5 and 6, respectively. This driving device 3 provided with, in addition to the piezoelectric actuators 111 and 112 and the driving rods 116 and 117 arranged on the same line, another piezoelectric actuator 113 and another driving rod 118. The driving rod 118 is arranged parallel to the driving rod 116, and the piezoelectric actuator 113 is, together with the piezoelectric actuator 111 and the driving rod 116, the second lens L2a is driven by the piezoelectric actuators 113 and the driving rod 118, and the third lens L3a is driven by the piezoelectric actuators 112 and the driving rod 117.

The lens frame 133 for holding the second lens L2a has the same structure as the other lens frames 131 and 132, and has a projection 133a in its obliquely upper portion and a projection 113b in its lower portion. The supporting wall 123 has two through holes so as to support the base-end portion of the driving rods 116 and 118. The supporting wall 126 also has two through holes so as to support the tip-end portion of the three driving rods 116, 117, and 118.

Instead of placing the driving rods 116 and 117 on the same line, it is also possible to form three through holes in the supporting wall 126 so as to support the tip-end portion of the driving rods 116 and 118 in the two through holes at the side and support the tip-end portion of the driving rod 117 in the through hole at the center.

The driving device of a fourth embodiment is for driving a zoom lens system composed of four movable lenses. For example, this driving device is used to drive all of the lenses shown n FIG. 9 individually, assuming that the first and third lenses L1 and L3 also movable.

Figure 7:
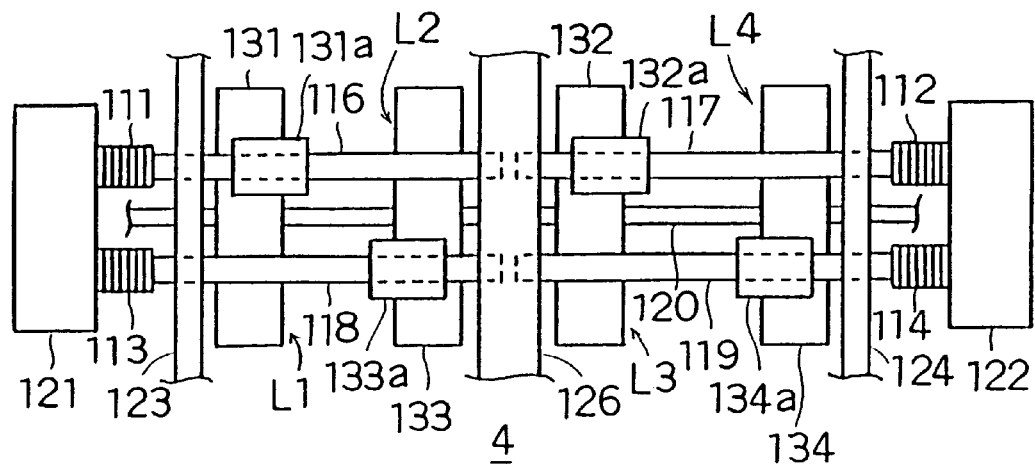
FIG. 7 is a plan view of the driving device of a fourth embodiment of the invention.
Figure 8:
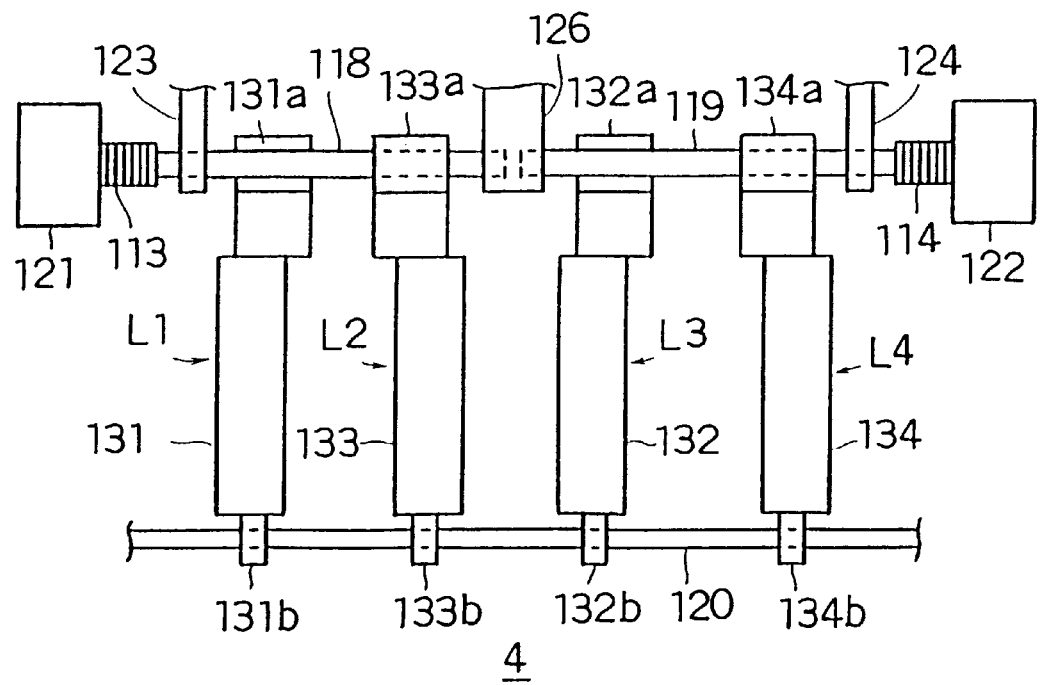
FIG. 8 is a side view of the driving device of the fourth embodiment.

A plan view and a side view of the driving device 4 of the fourth embodiment are shown in FIGS. 7 and 8, respectively. This driving device 4 is difference from the driving device 3 of the third embodiment in that this driving device 4 is additionally provided with another piezoelectric actuators 114 and another driving rod 119. The driving rod 119 is arranged on the same line as the driving rod 118, and its base-end and tip-end portions are supported by the supporting walls 124 and 126, respectively. The piezoelectric actuator 114 is, together with the piezoelectric actuator 112, fixed to the base block 122. The first lens L1 is driven by the piezoelectric actuator 111 and the driving rod 116, the second lens L2 is driven by the piezoelectric actuator 113 and the driving rod 118, the third lens L3 is driven by the piezoelectric actuator 112 and the driving rod 117, and the fourth lens L4 is driven by the piezoelectric actuator 114 and the driving rod 119.

The driving devices of the first to fourth embodiments described above, having shorter driving rods and thus suffering less from absorption of the driving force and delay in transmission thereof, are suitable for use in precision instruments that require accurate driving to be achieved in a compact and light-weight structure. Note that, although the above descriptions deal only with cases in which a taking lens is driven, the driving devices having driving rods arranged as described above are applicable to any instrument or apparatus in which driven members need to be driven individually. Moreover, although piezoelectric actuators are used as driving elements in the embodiments described above, it is also possible to use driving elements of any other type, for example motors that rotate driving rods.

Figure 14:
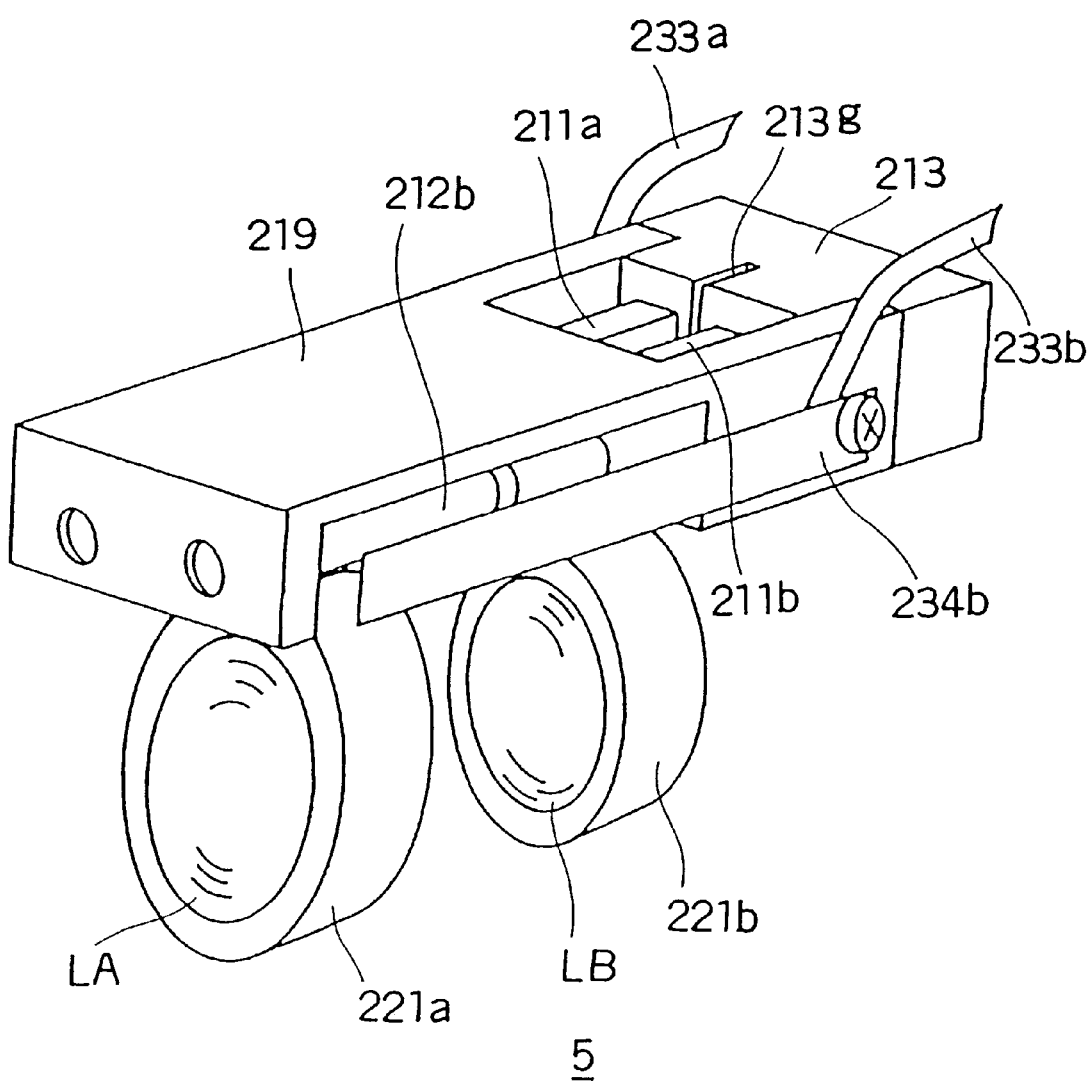
FIG. 14 is a perspective view of the driving device of a fifth embodiment of the invention.
Figure 15:
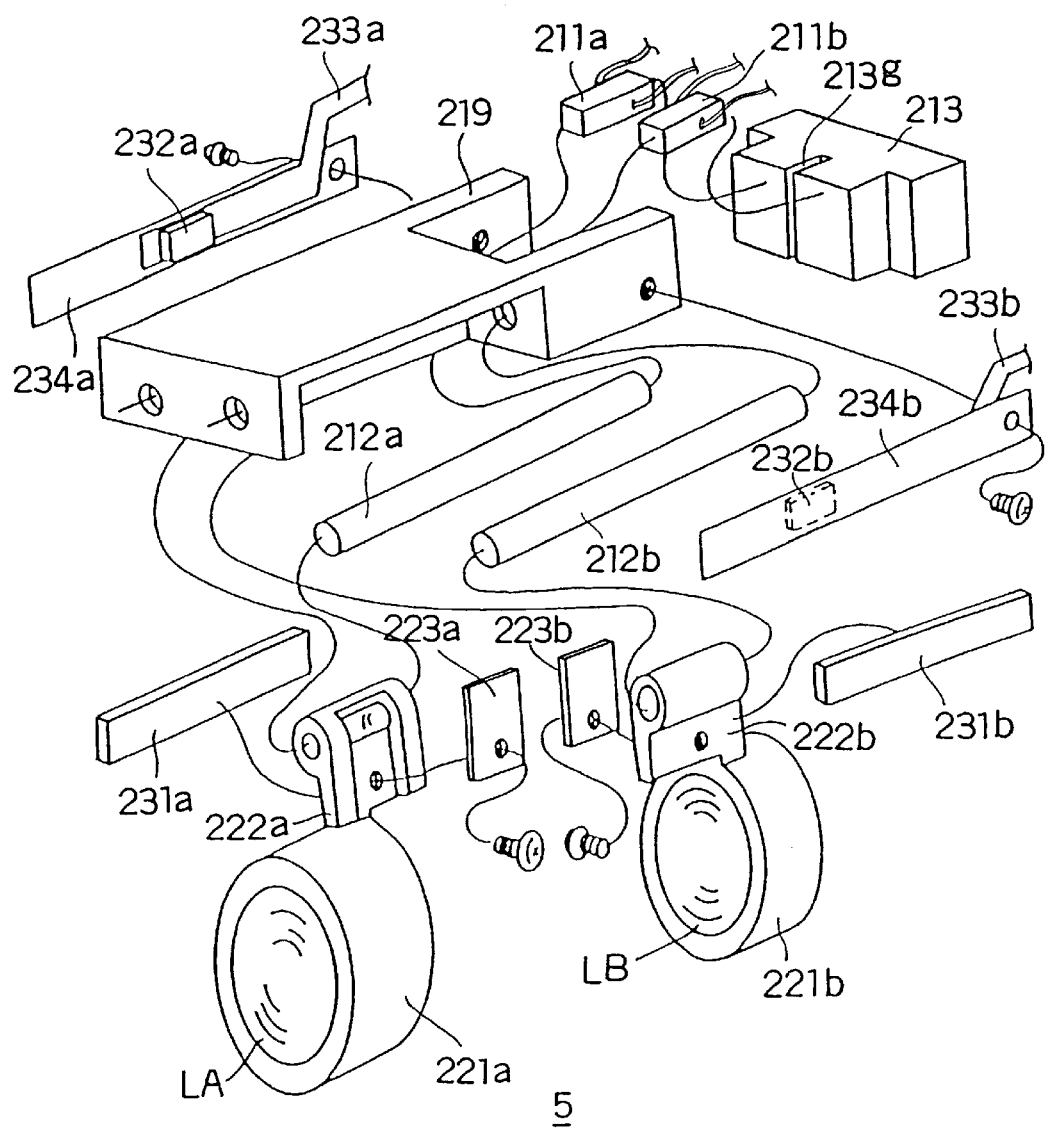
FIG. 15 is an exploded perspective view of the driving device of the fifth embodiment.

An external view and an exploded view of the driving device 5 of a fifth embodiment of the invention are shown in FIGS. 14 and 15, respectively. The driving device 5 is used to drive two movable lenses LA and LB included in a zoom lens system while keeping them in a predetermined positional relationship so as to vary the focal length while keeping the focal point fixed. The lenses LA and LB are movable through approximately several millimeters.

The driving device 5 is composed of two piezoelectric actuators 211a and 211b serving as driving elements, two driving rods 212a and 212b, one base block 213, and a frame 219. The piezoelectric actuators 211a and 211b are, at their rear-end surface, fixed to the base block 213, and expand or contract in the direction connecting their front-end and rear-end surfaces in accordance with the magnitude of the voltage applied thereto. The base block 213 is fixed to the frame 219. The driving rods 212a and 212b are made of a highly rigid carbon resin, and are arranged parallel to each other, with their rear end fixed to the front-end surface of the piezoelectric actuators 211a and 211b, respectively. The front-end and rear-end portions of the driving rods 212a and 212b are individually placed through through holes formed in the frame 219 and are thereby so supported as to be slidable along their axes.

The lenses LA and LB are held in lens frames 221a and 221b, respectively. The lens frames 221a and 221b have projections 222a and 222b are formed in their obliquely upper portion, and through these projections 222a and 222b are formed through holes through which the driving rods 212a and 212b are placed. In the inward-facing surface of the projections 222a and 222b, openings are formed through which a portion of the driving rods 212a and 212b is exposed, and plate springs 223a and 223b are screwed by which the portion of the driving rods 212a and 212b exposed through the openings is pressed with an adequate force. By the pressing force of the plate springs 223a and 223b, the inner surfaces of the through holes formed through the projections 222a and 222b are kept in slidable contact with the driving rods 212a and 212b. The optical axes of the lenses LA and LB, which are supported by the driving rods 212a and 212b in this way, lie on the same line.

To detect the driving amounts of the lenses LA and LB, on the outward-facing surfaces of the projections 222a and 222b of the lens frame 221a and 221b are fitted, parallel to the driving rods 212a and 212b, strip-like magnetized plates 231a and 231b having N-pole and S-pole regions formed with a pitch of about 100 :m. Arranged so as to face these magnetized plates 231a and 231b are magnetic resistance (MR) sensors 232a and 232b. The MR sensors 232a and 232b are mounted on flexible printed circuit boards 233a and the 233b, which are firmly fitted to plate springs 234a and 234b that are screwed to the frame 219.

The MR sensors 232a and 232b have a spacer (not shown) having a uniform thickness bonded over their surface, and are lightly pressed against the magnetized plates 231a and 231b by the pressing force of the plate springs 234a and 234b so as to be kept at a constant distance from the surface of the magnetized plates 231a and 231b. As the magnetized plates 231a and 231b move together with the lens frames 221a and 221b, the magnetic field around the MR sensors 232a and 232b changes, and thus, on the basis of the outputs of the MR sensors 232a and 232b, the driving amounts of the lenses LA and LB are detected.

A voltage as shown in FIGS. 13A and 13B described previously is applied to the piezoelectric actuators 211a and 211b. The voltage applied to the piezoelectric actuators 211a and 211b is controlled individually, so that the lenses LA and LB are kept in a predetermined positional relationship.

Figure 16:
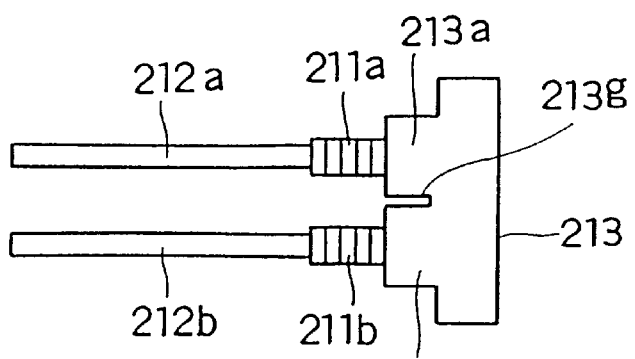
FIG. 16 is a plan view of the base block, piezoelectric actuators, and the driving rods of the driving device of the fifth embodiment.

A plan view of the base block 213, having the piezoelectric actuators 211a and 211b fixed thereto, is shown in FIG. 16. The base block 213 is formed integrally out of stainless steel in such a way that the top surface of the portion 213a on which the rear-end surface of the piezoelectric actuators 211a is fixed and the top surface of the portion 213b on which the rear-end surface of the piezoelectric actuators 211b is fixed are at the same level. Between these two portions 213a and 213b, a grove 213g is formed so as to extend from the top end to the bottom end thereof. Thus, the rear-end surfaces of the piezoelectric actuators 211a and 211b are fixed to surfaces that are not continuous.

The vibration caused in the portion of the base block 213 near its top surface by the expansion and compression of the piezoelectric actuator 211a is blocked by the groove 213g so as to remain within the portion 213a, and thus the vibration is scarcely propagated to the portion 213b. Similarly, the vibration caused in the portion of the base block 213 near its top surface by the expansion and compression of the piezoelectric actuators 211b is blocked by the groove 213g so as to remain within the portion 213b, and thus the vibration is scarcely propagated to the portion 213a. In this way, the expansion and contraction of the piezoelectric actuators 211a and 211b scarcely affect each other, and therefore neither the timing with which a voltage is applied to the piezoelectric actuators 211a and 211b, nor the waveform of the voltage applied, seriously affects the driving of the lenses LA and LB.

Figure 17:
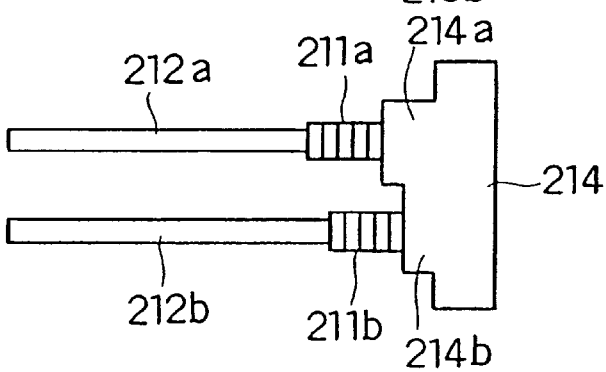
FIG. 17 is a plan view of the base block, piezoelectric actuators, and driving rods of the driving device of a sixth embodiment of the invention.

A plan view of the base block of the driving device of a sixth embodiment, having piezoelectric actuators fixed thereto, is shown in FIG. 17. The driving device of the sixth embodiment has the same structure as the driving device 5 except for the base block. In this driving device, the base block 214 is formed integrally out of stainless steel in such a way that the surfaces on the which the piezoelectric actuators 211a and 211b are fixed are at different levels. That is, the top surface of the portion 214a on which the rear-end surface of the piezoelectric actuator 211a is fixed is higher than the top surface of the portion 214b on which the rear-end surface of the piezoelectric actuator 211b is fixed.

Since the top surface of the portion 214a is not directly continuous with the portion 214b, the vibration caused in the portion of the base block 214a near its top surface by the expansion and compression of the piezoelectric actuator 211a is scarcely propagated to the portion 214b. On the other hand, the vibration caused in the portion of the base block 214b near its top surface by the expansion and compression of the piezoelectric actuator 211b is propagated only to the deep part of the portion 214a, and is thus scarcely propagated to the top surface of the portion 214a. In this way, the expansion and contraction of the piezoelectric actuators 211a and 211b scarcely affect each other, and therefore neither the timing with which a voltage is applied to the piezoelectric actuators 211a and 211b, nor the waveform of the voltage applied, seriously affects the driving of the lenses LA and LB.

Figure 18:
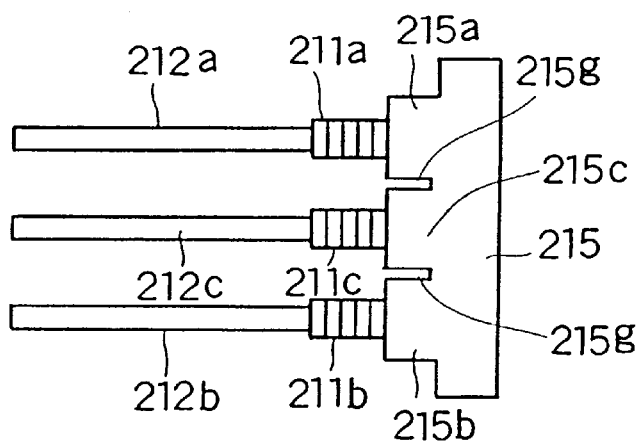
FIG. 18 is a plan view of the base block, piezoelectric actuators, and driving rods of the driving device of a seventh embodiment of the invention.
Figure 19:
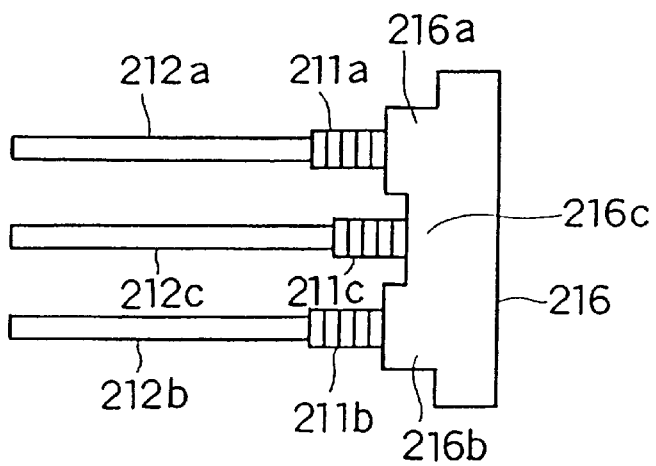
FIG. 19 is a plan view of the base block, piezoelectric actuators, and the driving rods of the driving device of an eighth embodiment of the invention.

Plan views of the base blocks of the driving devices of a sixth and a seventh embodiment, having piezoelectric actuators fixed thereto, are show in FIGS. 18 and 19, respectively. These driving devices are for driving three lenses, and are each provided with three piezoelectric actuators 211a, 211b, and 211c, three driving rods 212a, 212b and 212c, and one base block 215 or 216.

In the base block 215, between the portions 215a, 215b, and 215c thereof for fixing the piezoelectric actuators 211a, 211b, and 211c, respectively, are formed grooves 215g. On the other hand, in the base block 216, the top surfaces of the portions thereof for fixing the piezoelectric actuators 211a, 211b, and 211c, respectively, are formed at different levels In these driving devices, as in the driving devices of the fifth and sixth embodiments, the expansion and contraction of the piezoelectric actuators 211a, 211b, and 211c scarcely affect one another, and thus the driving of driven members is not affected seriously. Although, in the base block 216, the top surface at the center is made lower than the top surfaces at the side, it is also possible to make the top surface at the center higher than the top surfaces at the side.

Although the above descriptions deal only with cases where the base block is made of stainless steel, the base block may be made of any material as long as it is highly rigid and highly dense. Moreover, the depth of the groove or grooves formed to restrict propagation of vibration, and the level difference between the top surfaces secured for the same purpose, is determined in consideration of the material of the base block, the weight of the driving rods, the expansion/contraction amount of the piezoelectric actuators, and other factors related to propagation of vibration.

With the driving devices of the fifth to eight embodiments described above, as compared with arrangements in which driving elements are fixed to separate base blocks, it is possible to make the weight of base block equivalent to the same weight multiplied by the number of driving elements while keeping the space occupied by the base block almost the same. Thus, it is possible to use the expansion and contraction of driving elements efficiently to displace driving rods and thereby drive driven members, without increasing the size of a driving device. Moreover, since the expansion and contraction of one driving element is scarcely propagated to another driving element, it is possible to drive individual driven members accurately.

Moreover, since propagation of vibration is restricted simply by providing a groove, or by securing a level difference, in a base block, it is not necessary to adopt a particularly complicated design for the base block. Thus, the base block can be manufactured easily, and an increase in cost can be prevented.

Figure 20:
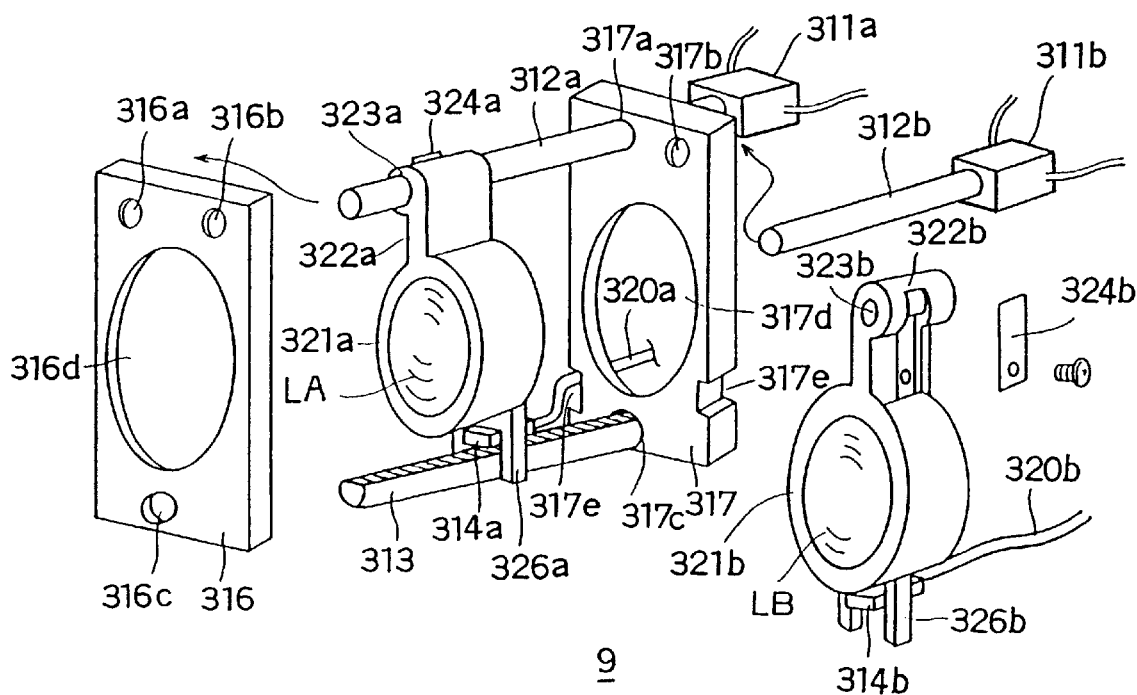
FIG. 20 is an exploded perspective view of the driving device of a ninth embodiment of the invention.

An exploded perspective view of the driving device 9 of a ninth embodiment of the invention is shown in FIG. 20. The driving device 9 is for driving two movable lenses LA and LB included in a zoom lens system while keeping them in a predetermined positional relationship so as to vary the focal length while keeping the focal point fixed. The lenses LA and LB are so arranged that their optical axes are aligned with each other, with the lens LA placed in front of the lens LB. The lenses LA and LB are movable through several millimeters.

The driving device 9 is composed of two piezoelectric actuators 311a and 311b, two driving rods 312a and 312b, one guide rod 313 serving also as a graduated member, two MR sensors 314a and 314b, and supporting walls 316 and 317. The piezoelectric actuators 311a and 311b are, at their rear-end surface, fixed to a base block (not shown), and expand or contract in the front/rear director in accordance with the magnitude of the voltage applied thereto. The driving rods 312a and 312b are, at their rear end, fixed to the front-end surface of the piezoelectric actuators 311a and 311b, and are displaced along their axis as the piezoelectric actuators 311a and 311b expand or contract.

The driving rods 312a and 312b are made of a highly rigid material such as a carbon resin. The driving rods 312a and 312b are arranged parallel to each other, and are supported by the supporting walls 316 and 317 so as to be slidable along their axis. The guide rod 313 is arranged below the mid line between the driving rods 312a and 312b and parallel thereto, and is fixed to the supporting walls 316 and 317.

The supporting walls 316 and 317 are arranged parallel to each other, and are fixed to the driving device itself The supporting wall 316 has through holes 316a and 316b through which the front-end portion of the driving rods 312a and 312b is placed in such a way that the outer surface thereof is kept in light slidable contact with the inner surface of the through holes 316a and 316b, a fixing hold 316c through which the front-end portion of the guide rod 313 is placed so as to be fixed, and a large-diameter opening 316d for directing light from the front to the lens LA. The supporting wall 317 has through holes 317a and 317b through which the rear-end portion of the driving rods 312a and 312b is placed in such a way that the outer surface thereof is kept in light slidable contact with the inner surface of the through holes 317a and 317b, a fixing hole 317c through which the rear-end portion of the guide rod 313 is placed so as to be fixed, and a large-diameter opening 317d for directing the light having passed through the lenses LA and LB to the rear. In the lower portion of the supporting wall 317 are formed cuts 317e through which flexible printed circuit boards 320a and 320b having MR sensors 314a and 314b fixed at their end are placed.

The lenses LA and LB are held in lens frames 321a and 321b, respectively. The lens frames 321a and 321b have projections 322a and 322b formed at their obliquely upper portion. Through these projections 322a and 322b are formed through holes 323a and 323b through which the driving rods 312a and 312b are placed. In side surfaces of the projections 322a and 322b, openings are formed through which a portion of the driving rods 312a and 312b is exposed, and plate springs 324a and 324b are screwed by which the portion of the driving rods 312a and 312b exposed through those openings is pressed with an adequate force. By the pressing force of the plate springs 324a and 324b, the inner surfaces of the through holes 323a and 323b are kept in slidable contact with the driving rods 312a and 312b.

The lens frames 321a and 321b have projections 326a and 326b formed in their lower central portion. In these projections 326a and 326b are formed grooves in which the guide rod 313 is placed. The upper surfaces of the grooves formed in the projections 326a and 326b are made level, and on these surfaces are placed the ends of the flexible printed circuit boards 320a and 320b on which the MR sensor 314a and 314b are fixed, with the detecting surfaces of the MR sensors 314a and 314b facing downward. The right-hand and left-hand inward-facing surfaces of the grooves of the projections 326a and 326b are made vertical, and are kept in slidable contact with the circumferential surface of the guide rod 313. The guide rod 313 blocks the movement of the lens frames 321a and 321b perpendicular to the driving direction and prevents rotation thereof about the driving rods 312a and 312b.

A voltage as shown in FIGS. 13A and 13B described previously is applied to the piezoelectric actuators 311a and 311b. The voltage applied to the piezoelectric actuators 311a and 311b is controlled individually, so that the lenses LA and LB are kept in a predetermined positional relationship.

Figure 21:
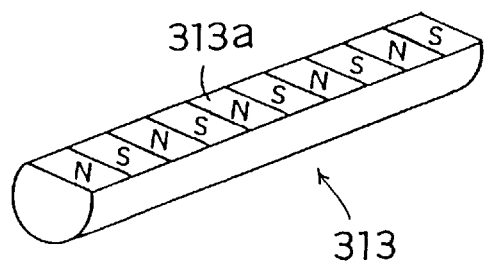
FIG. 21 is a perspective view of the guide rod of the driving device of the ninth embodiment.

An external view of the guide rod 313 is show in FIG. 21. The guide rod 313 is made of a resin containing a magnetic material, and is shaped in a cylinder having a portion thereof removed parallel to its center axis, i.e. a cylinder having a flat surface parallel to its center axis. This flat surface 313a is magnetized in such a way that many N-pole and S-pole regions are alternately formed thereon along the direction of its axis with a predetermined pitch of about 100 p.m. The guide rod 313 is fixed horizontally to the supporting walls 316 and 317 with the magnetized surface 313a facing upward, and is, at its portions located at both ends of its diameter, kept in contact with the inward-facing surfaces of the grooves formed in the projections 326a and 326b. The detecting surfaces of the MR sensors 314a and 314b are placed parallel to the magnetized surface 313a so as to face the magnetized surface 313a with a predetermined distance secured therebetween.

Around the MR sensors 314a and 314b, the magnetized surface 313a of the guide rod 313 forms a magnetic field along the movement direction with a predetermined cycle. When the lenses LA and LB are driven, the magnetic environment around the MR sensors 314a and 414b fixed on the lens frames 321a and 321b changes periodically, and thus the values output from the MR sensors 314a and 314b change periodically. From the number of cycles of change of the values output from the MR sensors 314a and 314b and the pitch with which the magnetized surface 313a is magnetized to have N-pole and S-pole regions, the driving amounts of the lenses LA and LB are calculated, and by accumulating the driving amounts from a predetermined reference position, the positions of the lenses LA and LB are determined.

In reality, not only calculation of the maximum and minimum values output from the MR sensors 314a and 314b, but also interpolation of the values output from the MR sensors 314a and 314b is performed in order to determine the positions of the MR sensors 314a and 314b relative to the magnetized surface 313a more accurately. This makes it possible to detect the positions of the lenses LA and LB with accuracy as high as or higher than to a tenth of the magnetization pitch of the magnetized surface 313a.

As described above, in the driving device 9, the magnetized surface 313a is, as graduations, shared to detect the positions of the lenses LA and LB, and therefore there occurs no deviation between the graduations read by the MR sensor 314a and the graduations read by the MR sensor 314b. Thus, there occurs no error due to deviation of graduations in the detected relative positions of the lenses LA and LB. In this way, even when the lenses LA and LB are driven individually, by driving them while detecting their positions, it is possible to drive them while keeping them in a predetermined positional relationship at all times. Moreover, since only one graduated member is required, the guide rod 313 is shared as the graduated member, it is possible to make the most of available space and thereby make the driving device compact.

Figure 22:
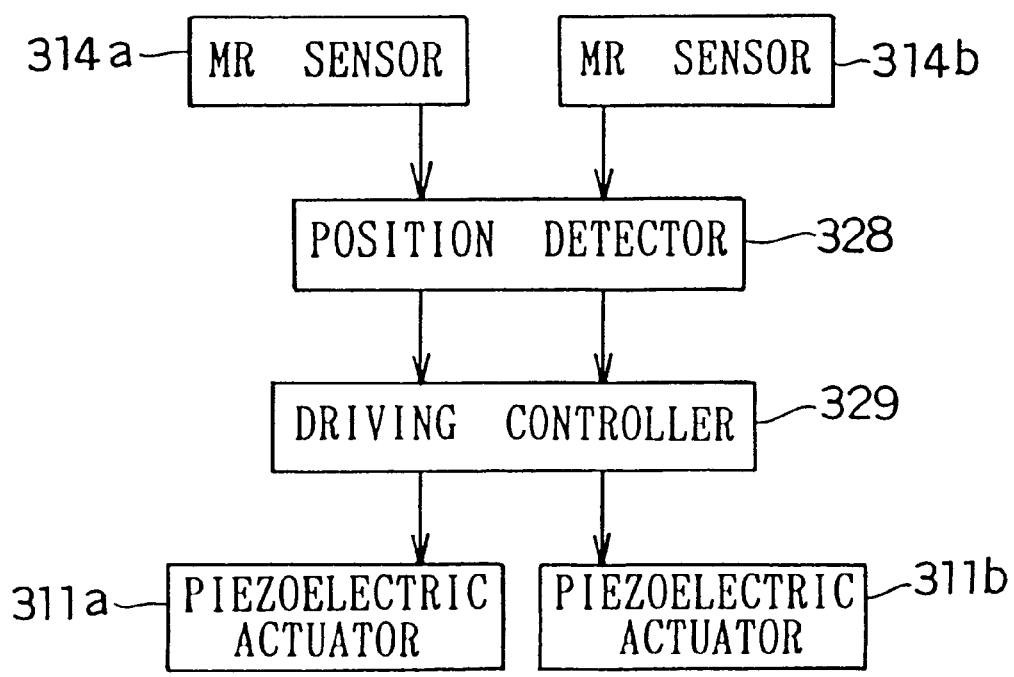
FIG. 22 is a block diagram showing the configuration for controlling the positions of the lenses in the driving device of the ninth embodiment.

FIG. 22 shows the configuration for controlling the positions of the lenses LA and LB in the driving device 9. The outputs of the MR sensors 314a and 314b are fed to a position detector 328. The position detector 328, on the basis of the number of occurrences of the maximum and minimum values in the output of the MR sensors 314a and 314b, calculates the positions of the lenses LA and LB with comparatively coarse accuracy that corresponds to the pitch with which the magnetized surface 313a is magnetized, and also, on the basis of the difference of the most recent output value from the maximum and minimum values, performs interpolation to correct the calculated positions. This makes it possible to determine the positions of the individual lenses LA and LB with accuracy as high as to several micrometers.

The position detector 328 feeds the calculated positions to a driving controller 329 for applying driving voltages to the piezoelectric actuators 311a and 311b. The driving controller 329, in accordance with the difference of the target positions of the lenses LA and LB from the positions of the lenses LA and LB as fed from the position detector 328, applies voltages to the piezoelectric actuators 311a and 311b, and, when the current positions of the lenses LA and LB coincide with their target positions, stops applying the voltage. In this way, the lenses LA and LB are moved to the target positions accurately.

Figure 23:
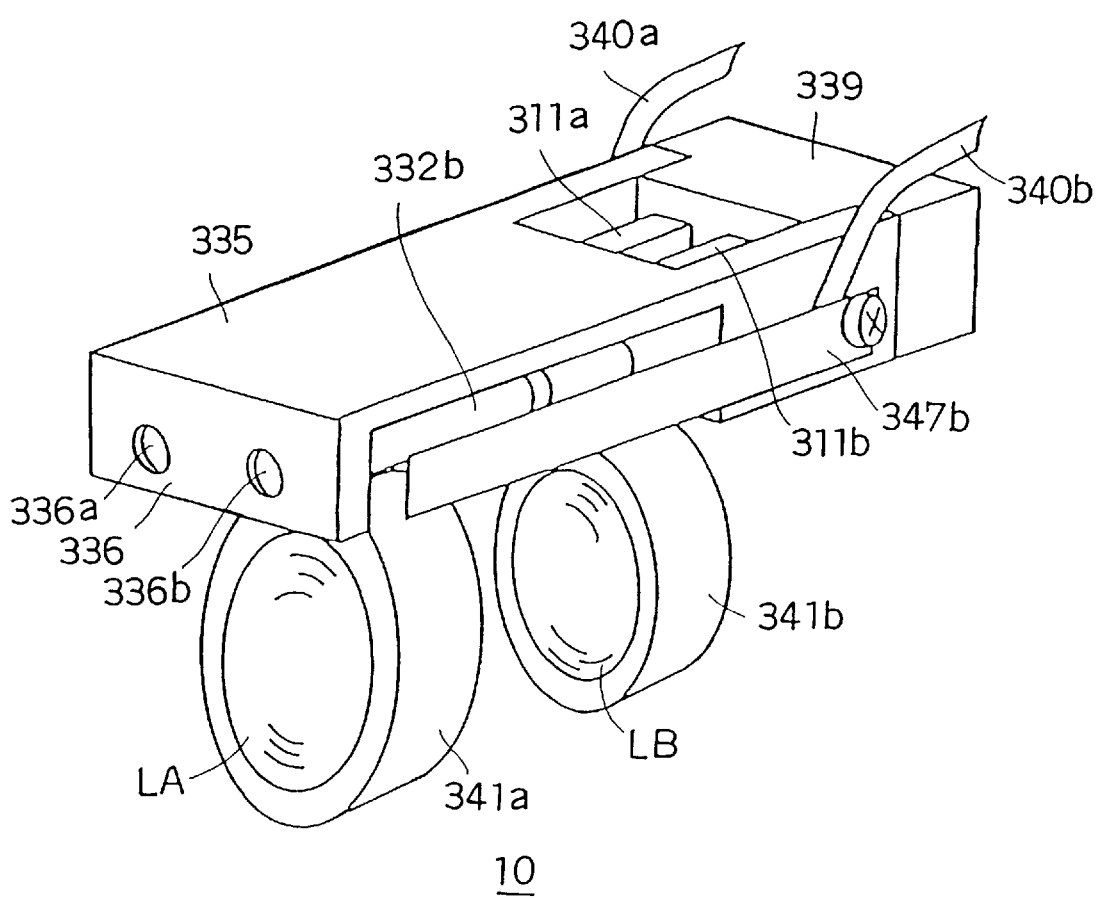
FIG. 23 is a perspective view of the driving device of a tenth embodiment of the invention.
Figure 24:
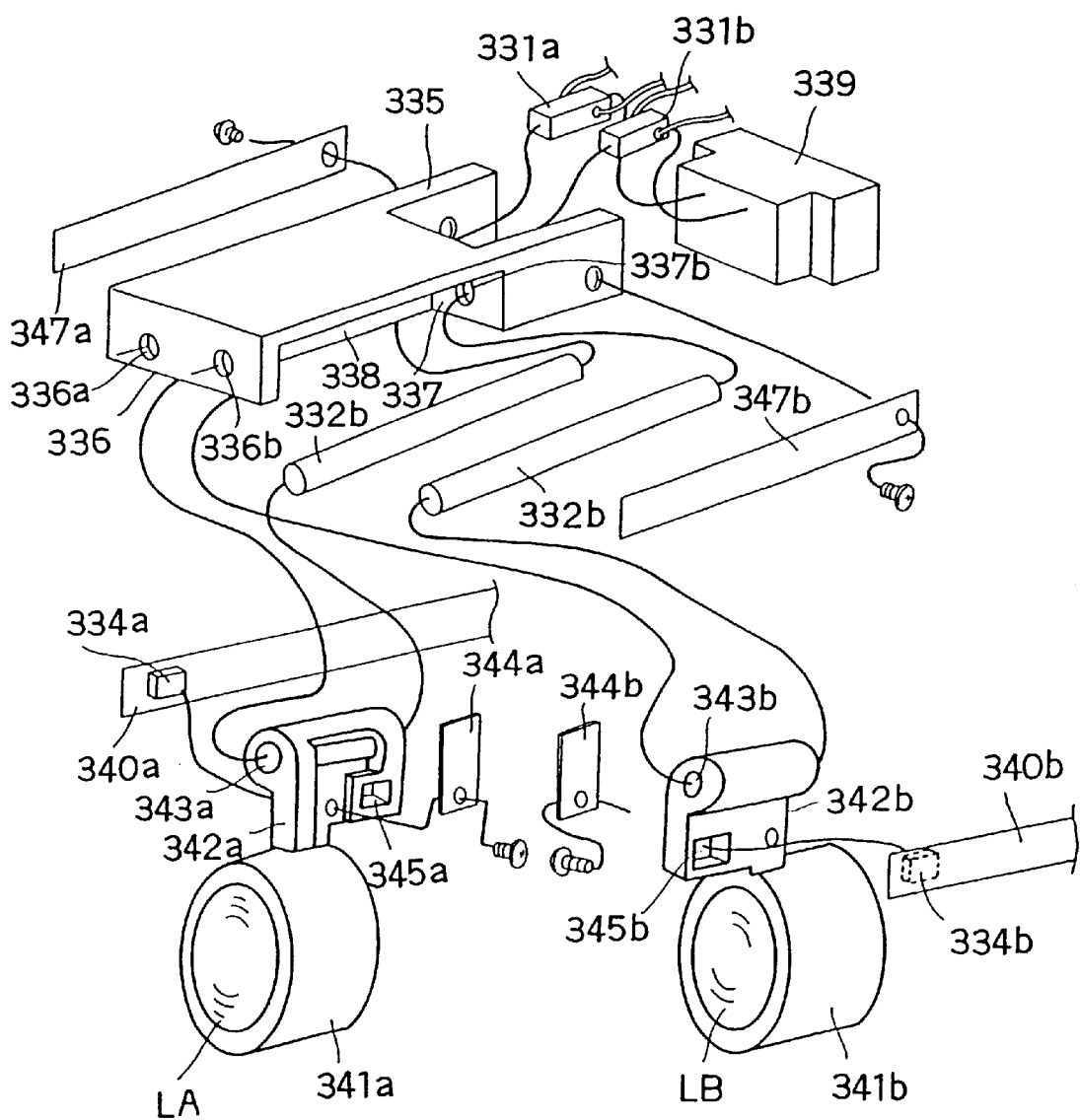
FIG. 24 is an exploded perspective view of the driving device of the tenth embodiment.

An external view and an exploded perspective view of the driving device of 10 of a tenth embodiment are shown in FIGS. 23 and 24, respectively. This driving device 10 is, like the driving device 9, for driving two movable lenses LA and LB included in a zoom lens system, and is composed of two piezoelectric actuators 331a and 331b, two driving rods 332a and 332b, two MR sensors 334a and 334b, and a frame 335.

The frame 335 has a guide wall 338 that extends longitudinally along the lateral center line of the frame 335, and has supporting walls 336 and 337 that are perpendicular to the guide wall 338. The frame 335 also has a base block 339 fixed in its rear portion. In the supporting walls 336 and 337 are formed through holes 336a, 336b, and 337b through which the driving rods 332a and 332b are placed so as to be slidably supported. Note that the through hole formed in the supporting wall 337 to support the driving rod 232a is not shown in FIGS. 23 and 24. The piezoelectric actuators 331a and 331b are, at their rear-end surface, fixed to the base block 339, and the driving rods 332a and 332b are arranged on both sides of the guide wall 338 and parallel thereto.

The lenses LA and LB are held in lens frames 341a and 341b, respectively. The lens frames 341a and 341b have projections 342a and 342b formed at their obliquely upper portion. Through these projections 342a and 342b are formed through holes 343a and 343b through which the driving rods 332a and 332b are placed. In side surfaces of the projections 342a and 342b, openings are formed through which a portion of the driving rods 332a and 332b is exposed, and plate springs 344a and 344b and screwed by which the portion of the driving rods 332a and 332b exposed through those openings is pressed with an adequate force. By the pressing force of the plate springs 344a and 344b, the inner surfaces of the through holes 343a and 343b are kept are in slidable contact with the driving rods 332a and 332b. In addition, through the projections 342a and 342b of the lens frames 341a and 341b, through holes 345a and 345b having a rectangular section are formed so as to face the guide wall 338.

The MR sensors 334a and 334b are fixed at the end of the flexible printed circuit board 340a and 340b, and are placed inside the through holes 345a and 345b. The MR sensors 334a and 334b have their four side surfaces kept in contact with the inner surfaces of the through holes 345a and 345b, and are thus held in such a way as to be movable in the direction perpendicular to the guide wall 338 but neither movable nor rotatable in a direction perpendicular to the direction in which they are movable.

On the right-hand and left-hand surfaces of the frame 335, plate springs 347a and 347b are screwed. The plate springs 347a and 347b serve to press the projections 342a and 342b of the lens frames 341a and 341b and the MR sensors 334a and 334b fixed on the circuit boards 340a and 340b against the guide wall 338.

Figure 25:
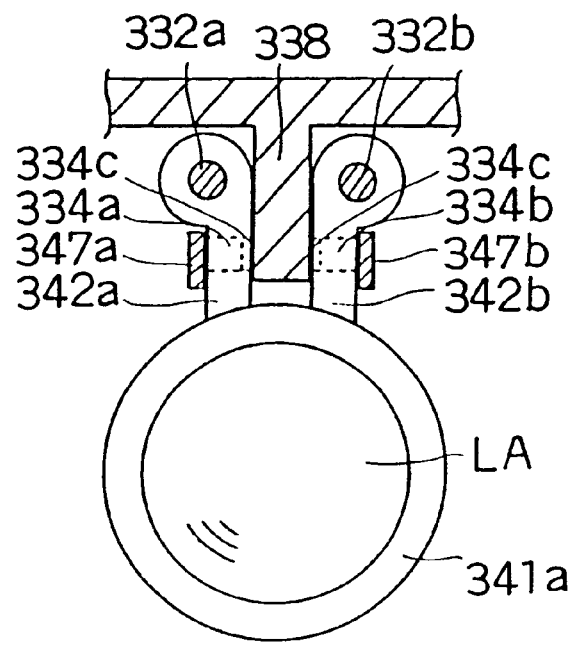
FIG. 25 is a front view of the lens frame and the portion around it of the driving device of the tenth embodiment.

The lens frame 341a and the portion around it as seen from the front is shown in FIG. 25. The projections 342a and 342b, pressed by the plate springs 347a and 347b, are kept in contact with the surfaces of the guide wall 338, and this prevents rotation of the lens frames 341a and 341b about the driving rods 332a and 332b. The MR sensors 334a and 334b have a spacer 334c having a uniform thickness bonded over their surface. By the pressing force of the plate springs 347a and 347b, these spaces 334c are kept in contact with the guide wall 338, and thus the MR sensors and 334a and 334b are kept at a constant distance from the surfaces of the guide wall 338.

Figure 26:
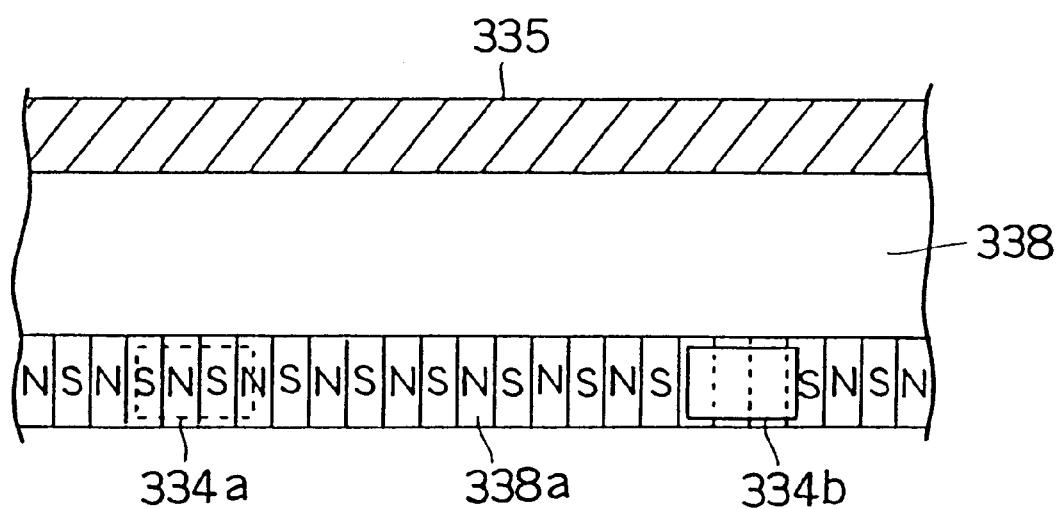
FIG. 26 is a side view of the guide wall and the portion around if of the driving device of the tenth embodiment.

The guide wall 338 as seen from the side is shown in FIG. 26. The guide wall 338 is made of a resin containing a magnetic material, and the portions of its right-hand and left-hand side surfaces facing the MR sensors 334a and 334b are magnetized in such a way that many N-pole and S-pole regions are formed alternately thereon along the direction of the axes of the driving rods 332a and 332b with a pitch of about 100 p.m. The right-hand and left-hand magnetized surfaces 338a are formed with the positions of the N- and S-pole regions aligned.

Around the MR sensors 334a and 334b, the magnetized surfaces 338a of the guide wall 338 form a magnetic field along the driving direction with a predetermined cycle. When the lenses LA and LB are driven, the magnetic environment of the MR sensors 334a and 334b fitted on the lens frames 341a and 341b changes periodically, and thus, on the basis of the outputs of the MR sensors 334a and 334b, the positions of the lenses LA and LB are determined.

In the driving device 10 of this embodiment, the positions of the lenses LA and LB are detected by using separate magnetized surfaces as two sets of graduations; nevertheless, since these two sets of graduations are provided on the same number, there occurs no deviation due to assembly errors between the two sets of graduations. Accordingly, it is possible to detect the relative positions of the lenses LA and LB accurately at all times, and thus it is possible to drive the lenses LA and LB while keeping them accurately in a desired positional relationship. Moreover, since only one graduated member is required, and the guide wall 338 is shared as the graduated member, it is possible to make the most of available space and thereby make the driving device 10 compact.

In the ninth and tenth embodiments described above, alternating magnetic poles are formed at regular intervals on the surface of the guide rod 313 or the guide wall 338 so as to be used as graduations. However, the property that can be used as graduations is not limited to magnetism, but may be any property that can be formed at regular intervals. For example, it is possible to use light reflectivity or electric conductivity.

Figure 27:
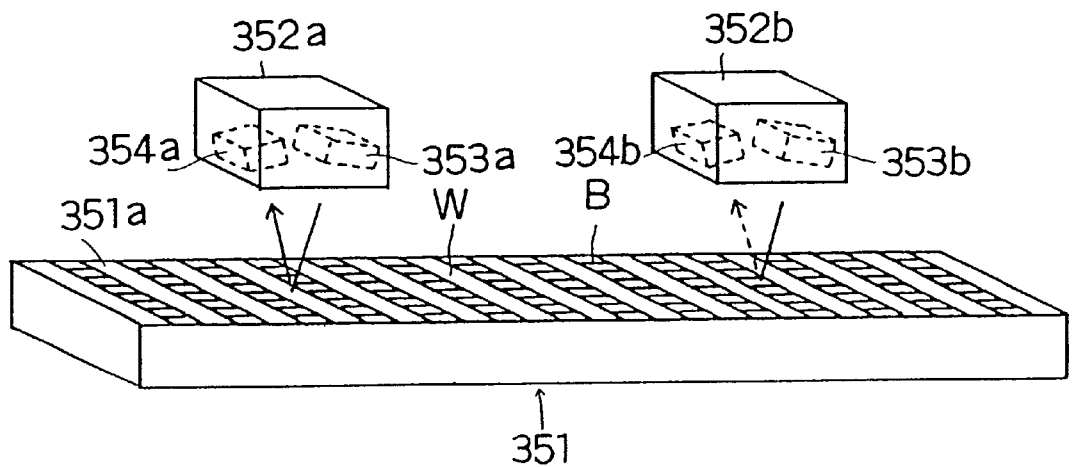
FIG. 27 is a perspective view of the graduated member and the sensor of the driving device of an eleventh embodiment of the invention.

FIG. 27 schematically shows the structure of the graduated member and the sensor of the driving device of an eleventh embodiment, in which light reflectivity is used as graduations. The graduated member 351 is fixed to the driving device itself, and has a flat surface 351a having a pattern of alternating white and black areas formed with a predetermined pitch. The white areas W of the pattern show high light reflectivity, and the black areas B show low light reflectivity. The sensors 352a and 352b are fitted to driven members (not shown) that are driven individually, and are arranged so as to face the surface 351a of the graduated member 351. When the driven members are driven, the sensors 352a and 352b move parallel to the graduated members 351.

The sensors 352a and 352b are composed of light emitting elements 353a and 353b for emitting light toward the surface 351a of the graduated member 351 and light sensing elements 354a and 354b for receiving the light reflected from the surface 351a. As the light emitting elements 353a and 353b, it is possible to use, for example, light emitting diodes or laser diodes; as the light sensing elements 354a and 354b, it is possible to use, for example, photodiodes or phototransistors. The light emitting elements 353a and 353b are so configured as to emit a light beam having a diameter smaller than the width of one white or black area of the pattern formed on the surface 351a of the graduated member 351.

The amount of light incident on the light sensing elements 354a and 354b varies periodically according to whether the light from the light emitting elements 353a and 353b strikes a white area W or a black area B of the pattern as the driven members are driven. This makes it possible to detect the movement amount of the driven members, and, by accumulating the movement amount from a predetermined reference position, the position of the driven members is determined.

Figure 28:
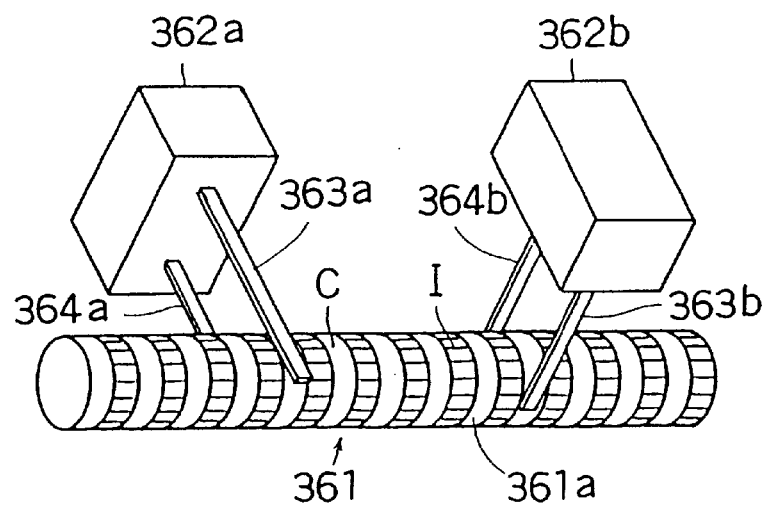
FIG. 28 is a perspective view of the graduated member and the sensor of the driving device of a twelfth embodiment of the invention.

FIG. 28 schematically shows the structure of the graduated member and the sensor of the driving device of a twelfth embodiment, in which electric conductivity is used as graduations. The graduated member 361 is cylindrical, and is fitted to the driving device itself. The graduated member 361 is made of an insulating material, and its circumferential surface is vapor-deposited with a conductive material such as aluminum so that conductive regions C are formed over the entire circumference with a predetermined pitch. The sensors 362a and 362b are fitted to driven members (not shown) that are driven individually, and are arranged to face the graduated member 361 from different directions. When the driven members are driven, the sensors 362a and 362b move parallel to the graduated member 361.

The sensor 362a has two electrical terminals 363a and 364a. The terminals 363a and 364a are arranged within a plane perpendicular to the axis of the graduated member 361, and are kept in contact with the circumferential surface 361a of the graduated member 361. The terminals 363a and 364a are so configured as to have a width smaller than the width of an insulating region I, i.e. a region where the circumferential surface is exposed, or a conductive region C. The sensor 362b has exactly the same structure, with its two electrical terminals 363b and 364b kept in contact with the circumferential surface 361a of the graduate member 361.

The conduction state of the terminals 363a and 364a, and that of the terminals 363b and 364b, varies periodically according to whether they are kept in contact with a conductive region C or an insulating region I as to the driven members are driven. This makes it possible to detect the movement amount of the driven members, and, by accumulating the movement amount from a predetermined reference position, the position of the driven members is determined.

An arrangement like that of this embodiment, in which sensors are so arranged as to face a single graduated member from different directions, helps increase flexibility in arrangement of sensors and driven members and thereby make designing of a driving device easy even in cases where a relatively large number of driven members need to be driven.

What property to use as graduations is determined in consideration of the use of the driving device and the complexity of the structure, including factors such as the type of driven members and the detection accuracy required. In particular, an arrangement that exploits magnetism, i.e. an arrangement in which a magnetic field is monitored by the use of an MR sensor, offers high detection accuracy, and is thus suitable for use in precision instruments such as a taking lens for a camera.

Obviously, many modifications and variations of the present invention are possible in light of the above teachings. It is therefore to be understood that within the scope of the appended claims, the invention may be practiced other than as specifically described.

What is claimed is:

1. A driving device comprising;

a first driving source;

a first driving rod coupled to the first driving source, the first driving rod driving a first driven member axially by using a driving force of the first driving source;

a second driving source; and a second driving rod coupled to the second driving source and arranged in a same direction as the first driving rod, the second driving rod driving a second driven member axially by using a driving force of the second driving source, wherein the first driving source is arranged at one end of an entire driving stroke of the first and second driven members and the second driving source is arranged at another end of the entire driving stroke of the first and second driven members.

2. A driving device as claimed in claim 1, wherein the first and second driving rods are arranged axially away from each other in such a way as not to reach into driving strokes of the second and first driven members, respectively, with the first driving source arranged at that end of the first driving rod farther from the second driving rod and the second driving source arranged at that end of the second driving rod farther from the first driving rod.

3. A driving device as claimed in claim 1, wherein the first and second driving rods are arranged on a same line.

4. A driving device as claimed in claim 1, wherein the first and second driving sources are piezoelectric actuators that expand or contract according to voltages applied thereto, wherein the first and second driving rods are kept in slidable contact with the first and second driven members, respectively, and wherein the first and second driving sources expand and contract repeatedly to vibrate the first and second driving rods axially and thereby drive the first and second driven members.

5. A driving device as claimed in claim 4, wherein the first and second driving sources are made to expand at high speed and contract at low speed, or expand at low speed and contract at high speed.

6. A driving device comprising:

a first driving element;

a first driving rod fixed to one end of the first driving element;

a second driving element;

a second driving rod fixed to one end of the second driving element; and a base block to which another end of the first driving element and another end of the second driving element are fixed, the base block having such a structure as to restrict propagation of vibration caused by the first driving element to the second driving element and of vibration caused by the second driving element to the first driving element.

7. A driving device as claimed in claim 6, wherein the first and second driving rods are arranged in a same direction, wherein the first and second elements individually expand and contract to vibrate the first and second driving rods axially, and wherein the base block restricts propagation of vibration in a direction perpendicular to the first and second driving rods.

8. A driving device as claimed in claim 7, wherein the base block has a groove formed between a portion to which the first driving element is fixed and a portion to which the second driving element is fixed.

9. A driving device as claimed in claim 7, wherein the base block has a level difference secured between a portion to which the first driving element is fixed and a portion to which the second driving element is fixed.

10. A driving device comprising:

a plurality of drivers for driving a plurality of driven members individually in a same direction or in opposite directions;

one graduated member whose surface property varies at regular intervals along a driving direction of the driven members;

a plurality of sensors for detecting the property, the sensors being fitted one to each of the driven members;

a position detector for detecting positions of the driven members based on a number of variations of the property as detected by the sensors; and a controller for controlling the drivers to drive the driven members based on the positions detected by the position detector.

11. A driving device as claimed in claim 10, wherein the graduated member serves also as a restricting member for restricting movement of the driven members in a direction perpendicular to the driving direction.

12. A driving device as claimed in claim 10, wherein the graduated member has only one surface having the property.

13. A driving device as claimed in claim 10, wherein the graduated member has two flat surfaces having the property, the two surfaces facing in different directions.

14. A driving device as claimed in claim 10, wherein the property is magnetism, and the graduated member has N-pole and S-pole regions formed alternately on its surface, and wherein the sensors are magnetic resistance sensors whose electrical resistance varies according to ambient magnetism.

* * * * *